US011482059B2

(12) United States Patent
Claessens et al.

(10) Patent No.: US 11,482,059 B2
(45) Date of Patent: *Oct. 25, 2022

(54) VEHICLE HEALTH MONITOR

(71) Applicant: Zoox, Inc., Foster City, CA (US)

(72) Inventors: Maurice Henri Andre Claessens, San Ramon, CA (US); Paul Choin, Pleasanton, CA (US)

(73) Assignee: Zoox, Inc., Foster City, CA (US)

( * ) Notice: Subject to any disclaimer, the term of this patent is extended or adjusted under 35 U.S.C. 154(b) by 370 days.

This patent is subject to a terminal disclaimer.

(21) Appl. No.: 16/856,597

(22) Filed: Apr. 23, 2020

(65) Prior Publication Data

US 2021/0335061 A1 Oct. 28, 2021

(51) Int. Cl.

| | |
|---|---|
| ***H04N 5/44*** | (2011.01) |
| ***G07C 5/08*** | (2006.01) |
| ***G07C 5/00*** | (2006.01) |

(52) U.S. Cl.

CPC ........... *G07C 5/0808* (2013.01); *G07C 5/008* (2013.01); *G07C 5/085* (2013.01); *G07C 5/0816* (2013.01)

(58) Field of Classification Search

CPC .... G07C 5/0808; G07C 5/008; G07C 5/0816; G07C 5/085; G07C 5/0841

See application file for complete search history.

(56) References Cited

U.S. PATENT DOCUMENTS

2016/0163130 A1 6/2016 Zagajac et al.
2017/0116793 A1* 4/2017 Lin ........................ G07C 5/008
2017/0125034 A1 5/2017 Kakadiaris et al.
2018/0204398 A1* 7/2018 Smith .................. G07C 5/0808
2019/0051414 A1* 2/2019 Lyubich ............... G06V 20/597
2019/0066399 A1* 2/2019 Jiang .................... G05D 1/0088
2019/0080528 A1* 3/2019 Bednar ................... H04W 4/38
(Continued)

FOREIGN PATENT DOCUMENTS

DE 102016114048 A1 2/2018
DE 102017111901 A1 12/2018
(Continued)

OTHER PUBLICATIONS

PCT Search Report and Written Opinion dated Jul. 15, 2021 for PCT Application No. PCT/US21/26906, 9 pages.
(Continued)

*Primary Examiner* — Munear T Akki
(74) *Attorney, Agent, or Firm* — Lee & Hayes, P.C.

(57) ABSTRACT

Techniques for monitoring and predicting vehicle health are disclosed. In some examples, sensor data (e.g., audio data) may be used to create a sensor signature associated with a vehicle component. The sensor signature may be compared with one or more second sensor signatures associated with the vehicle component over the life of the vehicle component to determine changes in an operating status associated with the vehicle component. In some examples, a machine learned model may be trained to identify a vehicle component and/or and operating status of a vehicle component based on sensor data that is inputted into the machine learned model. In this way, sensor data may be input into the machine learned model and the machine learned model may output a corresponding vehicle component and/or operating status associated with the component.

20 Claims, 7 Drawing Sheets

(56) References Cited

U.S. PATENT DOCUMENTS

| | | | | |
|---|---|---|---|---|
| 2020/0043258 | A1* | 2/2020 | Jiang .................... | G07C 5/0825 |
| 2021/0192860 | A1 | 6/2021 | Kale et al. | |
| 2021/0335062 | A1 | 10/2021 | Claessens et al. | |
| 2021/0335064 | A1 | 10/2021 | Kim et al. | |
| 2021/0342211 | A1 | 11/2021 | Melo et al. | |

FOREIGN PATENT DOCUMENTS

| | | | |
|---|---|---|---|
| FR | 2814841 | A1 | 4/2002 |
| RU | 2615806 | C1 | 4/2017 |

OTHER PUBLICATIONS

Office Action for U.S. Appl. No. 16/856,733, dated Jun. 10, 2022, Claessens, “Predicting Vehicle Health”, 27 pages.

* cited by examiner

VEHICLE HEALTH MONITOR

BACKGROUND

Vehicles include a wide range of individual components or systems which can wear out, fail, or otherwise need service or replacement over a lifespan of the vehicle. Many vehicles today rely on periodic service to diagnose and detect component wear. Some vehicles may remind users to perform the periodic service. Additionally, some vehicles notify users when individual components fail or are wearing out. By this time, however, servicing the component may be inconvenient or may result in downtime of the vehicle. Additionally, the component may have experienced irreparable damage, thus resulting in a greater expense to replace the component. Furthermore, the failure of the component may have also resulted in damage and/or failure of other components of the vehicle, even further increasing the expense of repair and/or the amount of labor required to repair and/or replace the components.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
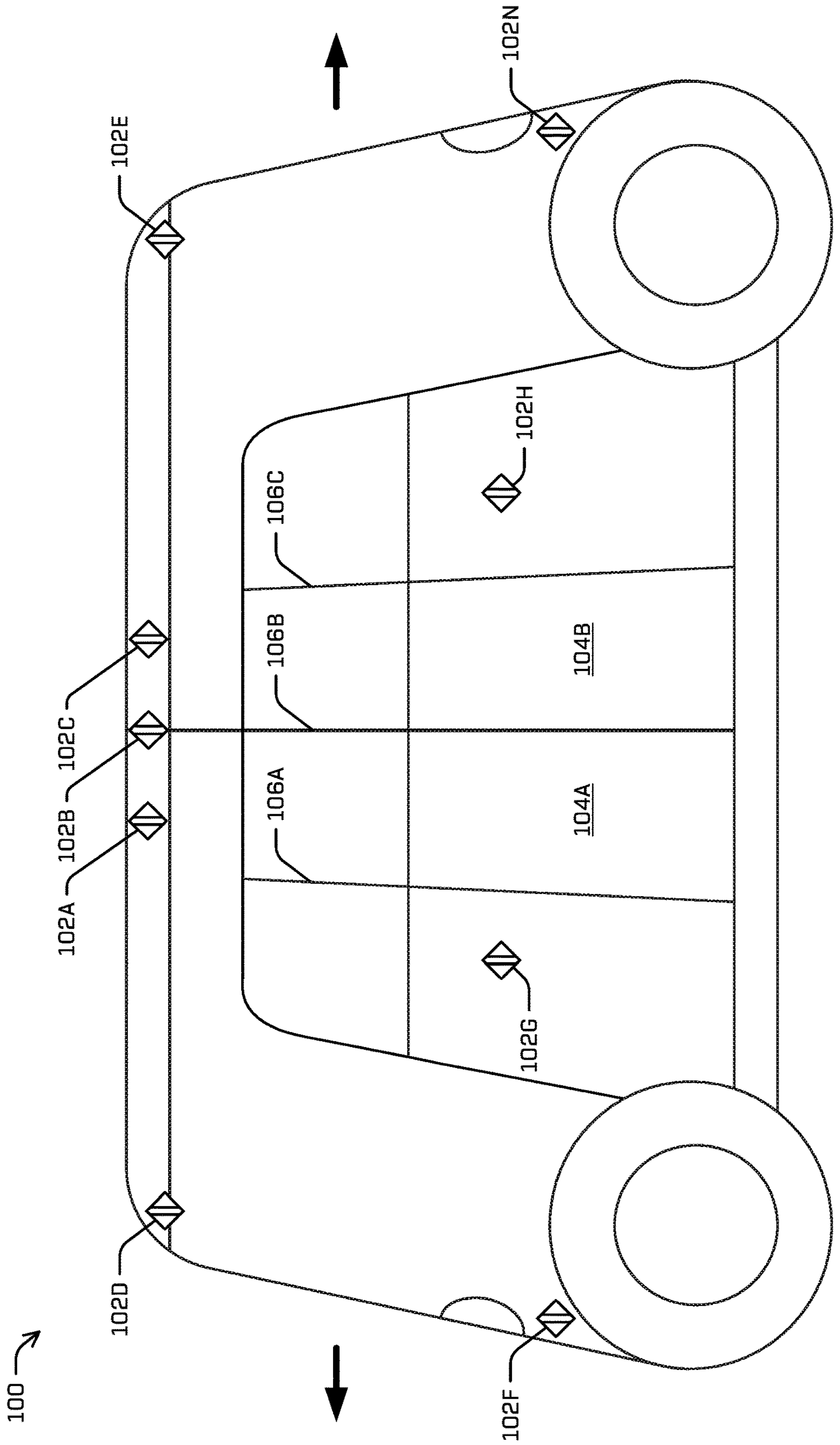
FIG. 1 is a schematic view of an example vehicle including a plurality of sensors.

As discussed above, vehicles may include a wide range of individual components or systems which can wear out, fail, or otherwise need service or replacement over a lifespan of the vehicle. Existing approaches to remind users to service their vehicles, or to notify users when a component has failed are inadequate since, by this point, servicing the component may be inconvenient for the user, the component may have experienced irreparable damage, and/or the failure of the component may have caused damage to other components of the vehicle.

This application describes systems and methods for monitoring vehicle health. In some examples, a vehicle may comprise one or more sensors (e.g., microphones, inertial measurement units (IMUs), temperature sensors, image sensors, piezoelectric sensors, pressure sensors, accelerometers, air quality sensors, voltage sensors, current sensors, etc.) that continuously or periodically gather sensor data associated with one or more components of the vehicle throughout the life of the vehicle. This sensor data may include sensor signatures associated with the one or more components of the vehicle. Additionally, the vehicle and/or a computer monitoring system associated with the vehicle may be able to determine changes in a sensor signature associated with a component of the vehicle over time. Based on determining changes in a sensor signature of a component, an operating status associated with the component of the vehicle may be determined. By way of example and not limitation, an “operating status” may include an indication of wear associated with a component of a vehicle, such as a percentage of life used and/or remaining of the component (e.g., 50% life used, 75% life remaining, etc.), a time-to-failure associated with the component, such as an amount of time and/or a distance the vehicle may travel until the component will likely fail (e.g., 10 hours until component failure, 100 miles until component failure, etc.), or an indication of an anomaly associated with the component, such as one or more fault conditions. In this way, vehicle health and/or vehicle component health may be more accurately monitored throughout the lifespan of the vehicle, and changes in a sensor signature of a component may be used to detect wear and/or predict failures, allowing for service to be performed before components fail and at times most convenient. Additionally, in some examples the techniques may be implemented using sensors that are already present on the vehicle, such that additional hardware is not required to implement at least some of the techniques described herein.

In some examples, a first (e.g., baseline, initial, original, etc.) sensor signature may be determined for a component of a vehicle. The first sensor signature may include an acoustic signature captured by one or more microphones, inertial measurements captured by one or more IMUs, temperature measurements captured by one or more temperature sensors, images from one or more image sensors, and/or combinations of these and/or other sensors. The first sensor signature may be determined during a bench test of the component or based on sensor data captured by another vehicle that previously experienced a failure and/or anomaly of a component of a same type (e.g., same or equivalent part number, make, model, category, etc.) as the component. Additionally, or alternatively, the first sensor signature may be determined at a first time (e.g., during a “test mode” associated with the vehicle when the vehicle is first commissioned or when the component is put into service). At the first time, the vehicle may perform one or more operations associated with causing the component to activate under one or more conditions so that sensor data associated with the component may be captured. For example, in the case of a fan of a heating ventilation and air conditioning (HVAC) system, the vehicle may cause the fan to run through all of its available settings (e.g., high, medium, low, etc.). In some examples, the vehicle may additionally run the fan through all of its available settings under multiple different conditions (e.g., while the temperature setting of the HVAC system is set at multiple different temperatures, while the vehicle is moving at different rates of speed, with one or more doors or windows open and closed, etc.) in order to isolate the sensor signature associated with the component under various operating conditions. The sensor data may then be used to determine the first sensor signature of the component. Additionally, a second (e.g., progressive, real-time, current, etc.) sensor signature may be determined for the component of the vehicle at a second time that is subsequent to the first time and/or the test mode. The second sensor signature may then be compared to the first sensor signature in order to determine an operating status associated with the component. The vehicle may perform the techniques described herein to determine sensor signatures for any or all of the components of the vehicle. In this way, component and/or vehicle health may be determined in real-time and before components fail. Additionally, these techniques enable the determination of component failure and/or anomalies without human interference (e.g., in the case of driverless and/or autonomous vehicles when an occupant of the vehicle may not be present to determine when a component is wearing out, failing or otherwise experiencing an anomaly).

As used herein, a "sensor signature" may comprise data representing a series of measurements from one or more sensors over time. The sample rate and characteristics of the sensor data may vary depending on the type(s) of sensor data used. In some examples, the sensor signature may include raw sensor data, while in other examples the sensor data may be filtered (e.g., to remove noise), compressed, or otherwise processed to obtain the sensor signature. In some examples, sensor signature may be represented as a vector or matrix representing one or more features of the sensor data. In some examples, such as in the context of audio data, the sensor signature may comprise a digital audio data stored in a known audio encoding format, such as MP3, advanced audio coding (AAC), Opus, Vorbis, or the like. In at least some examples, the sensor signature may comprise information derived from the raw sensor data such as, but not limited to, Fourier transforms, Laplace transforms, principle component analysis, harmonic decomposition, and/or any other method of determining features associated therewith.

Multiple sensor signatures (e.g., a first sensor signature and a second sensor signature) may be compared using a variety of different comparison techniques depending on the type(s) of sensor data used, the format of the sensor signatures, and/or the criteria upon which the sensor signatures are to be compared. For instance, in the context of audio data, criteria to be compared may include frequency (including sets of frequencies), magnitude, tonality, visual appearance of a wave form, etc. By way of example and not limitation, sensor signatures may be compared based on their similarity in time domain (with and/or without a shift), their similarity in frequency domain (again with and/or without a shift), and/or similarity in energy or power. In some examples, the comparisons could be performed based on a weighted representation of any or all of these or other criteria. Comparisons can be made over an entire correlation vector to measure total general correlation and/or over only values in a correlation vector that surpass a threshold value (e.g., to filter out noise, echoes, etc.).

In some examples, a machine learned model may be trained to determine one or more components of a vehicle associated with sensor data and/or a sensor signature. For instance, based on a specific type of sensor data (e.g., audio data, IMU data, image data, etc.) and/or a sensor signature, the machine learned model may determine a component of the vehicle that produced/generated the specific sensor data and/or sensor signature. Additionally, or alternatively, the machine learned model may be trained to detect changes in sensor signatures for individual components and/or to determine an operating status associated with a component of a vehicle. For example, sensor data and/or a sensor signature may be inputted into the machine learned model, and, in response, the machine learned model may determine and/or output a corresponding operating status associated with the component that produced the sensor data and/or the sensor signature. In some examples, the machine learned model may be trained to determine an estimated amount of time until the component of the vehicle is predicted to experience a failure or otherwise need service. In this way, servicing the vehicle and/or the component may be performed at a convenient time prior to failure, thereby avoiding costly downtime and avoiding damage to other components. Additionally, in some examples, periodic preventive service may be avoided and service may be performed only when necessary. This can avoid unnecessary downtime and allow vehicle components to reach their maximum life expectancy, instead of prematurely replacing and/or repairing vehicle components for precautionary reasons. The techniques described herein are configurable for the monitoring of virtually any component of a vehicle by using live sensor data (e.g., audio data, accelerometer data, voltage measurements, current measurements, imaged data, piezoelectric sensor data, pressure data, temperature data, etc.) to determine sensor signatures associated with components, and then evaluate those sensor signatures over time to accurately monitor vehicle health.

By way of example, and not limitation, a method of monitoring vehicle health according to this application may include activating a component of the vehicle at a first time and receiving, from a sensor of the vehicle, first data associated with the component of the vehicle at the first time. In this way, a first sensor signature that is associated with the component of the vehicle at the first time may be determined and stored based at least in part on the first data. The first data may include first sensor data, such as audio data, inertial measurements, image data, etc. The first sensor signature may, in some instances, comprise a baseline sensor signature. In additional or alternative examples, a first sensor signature indicative of an operating status associated with the component of the vehicle may be stored. In this way, the first sensor signature may be based on bench test sensor data associated with a similar component to the component or based on stored log data that was captured by one or more sensors of another vehicle that experienced a failure and/or other anomaly of the similar component. For instance, in the case of a brake system of the vehicle, brake pads generally include wear indicators that cause the brake pads to squeal after the brake pads have experienced a threshold amount of wear (e.g., 80%, 85%, 90%, etc.). During a bench test, a brake pad that has experienced the threshold amount of wear (e.g., by being used on another vehicle, artificially machined, etc.) may be used to establish the first sensor signature for use by the system (e.g., baseline acoustic signature). In at least some examples, such a first sensor signature may be associated with operating conditions (or parameters) of the vehicle (and/or components, subcomponents, etc.) during the test. As non-limiting examples, the first sensor signature may be associated with an engine speed, operating status of other components (e.g., HVAC temperature and/or fan speed), brake pressure, and the like.

As used herein, a "first time," "second time," "third time," and so on may include a specific point in time and/or may include a period of time. In some examples, the first time may correspond to a test state that is performed when the vehicle is first commissioned. Additionally, or alternatively, the test state may be performed when a component of the vehicle is put into service (e.g., replaced, repaired, etc.). In some examples, a second time, third time, etc. may correspond to a diagnostic state that is performed at a time subsequent to the first time to monitor vehicle health. The second and subsequent times may be periodic (e.g., daily, weekly, monthly, etc.) and/or may be triggered by one or more events (e.g., when the vehicle is out of service, when the vehicle is charging, when the vehicle is parked, when the vehicle is in transit, etc.).

In some examples, the method may include determining and/or storing a second sensor signature associated with the vehicle component at a second time. The second sensor signature may, in some instances, comprise a progressive sensor signature and the second time may be subsequent to the first time described above. Additionally, determining the second sensor signature may be based at least in part on second data. In at least one example, to determine the second sensor signature the method may include causing the vehicle to activate the component at the second time. In this way, the second data associated with the vehicle component may be received from the sensor at the second time. The second data may include second sensor data, such as audio data, inertial measurements, image data, etc.

In some examples, the method may include determining whether a variation and/or association exists between the first sensor signature and the second sensor signature. If a variation and/or association exists, the method may include determining and/or outputting an operating status associated with the component based at least in part on the variation between the first sensor signature and the second sensor signature. Additionally, or alternatively, the method may include determining whether the variation is greater than a threshold variation and may determine and/or output an operating status associated with the component based at least in part on the variation being greater than the threshold variation. In some examples, the method may include determining an estimated time-to-failure associated with the component (e.g., an estimated number of miles, in-service hours, etc. until the component may fail) of the vehicle based at least in part on the first sensor signature, the second sensor signature, and/or the variation and/or association between the first sensor signature and the second sensor signature. This estimated time-to-failure may additionally be output, logged, and/or sent to a remote monitoring system associated with the vehicle. In some examples, determining the variation and/or association between the first sensor signature and the second sensor signature may be based at least in part on a comparison of, among other things, frequency and/or magnitude of the respective sensor signatures. Additionally, or alternatively, determining the variation and/or association between the first sensor signature and the second sensor signature may be based at least in part on performing a tonality analysis of the respective sensor signatures (e.g., which frequencies stand out as opposed to background noise) and/or operating conditions associated with the vehicle and/or component (e.g., revolutions per minute (RPM), speed, steering angle, temperature, and the like). In at least some examples, such comparisons may be based on, for example, operating parameters of the vehicle and/or other components. In such examples where current operating parameters differ from the current parameters, interpolations or extrapolations may be used to alter the first signature and/or adjust a threshold difference for comparison.

In some examples, determining sensor signatures (e.g., the first sensor signature and/or the second sensor signature) may be based at least in part on processing sensor data (e.g., the first data and/or the second data). For instance, if the sensor data comprises audio data, the audio data may include an acoustic signature associated with a component of the vehicle, as well as background noise. As such, the audio data may be processed (e.g., filtered) to remove at least some of the background noise from the audio data. In this way, the portion of the audio signature attributable to the component may be isolated and/or the quality of the acoustic signature of the audio data may be improved to better monitor vehicle health. Additionally, processing sensor data may include setting limits for a signal-to-noise ratio of the sensor data, setting a target frequency of the sensor data, including performing fast Fourier transform (FFT) processing on the sensor data to transform the sensor data from a time domain to a frequency domain, and the like.

In some examples, while activating the component of the vehicle at the first time and at the second time to receive the first data and the second data as described above, the method may further include controlling operation of one or more other components of the vehicle at the first time and at the second time according to an operating parameter. For instance, if the component being activated is a fan of an HVAC system, then the vehicle may run the fan through various settings while controlling operation of other components according to the operating parameter (e.g., while the vehicle is moving at different rates of speed, while the vehicle is stopped, with one or more doors or windows open and closed, etc.). In this way, the component being activated may be isolated under various operating conditions to record the sensor signature. Additionally, controlling operation of the other components according to the operating parameter may allow for more consistent measurements associated with the sensor signatures. In additional examples, the operating parameter may include a speed of the vehicle, speed of the component (e.g., translational or rotational), steering angle, environmental air temperature, environmental humidity, environmental weather (e.g., rain, snow, sunny, etc.), component temperature, time of day, barometric pressure (e.g., altitude), and the like.

In some examples, the method may further include causing the vehicle and/or the component to be serviced. Causing the vehicle and/or component to be serviced may be based at least in part on the operating status of the component, an estimated time-to-failure of the component, a sensor signature of the component, etc. Additionally, causing the vehicle and/or component to be serviced may include outputting an indication that the vehicle needs to be serviced, scheduling a time for the vehicle to be serviced, causing the vehicle to autonomously navigate to a service location, and/or a combination thereof.

In some examples, determining whether a variation between the first sensor signature and the second sensor signature is greater than a threshold variation may be based at least in part on a third sensor signature. The third sensor signature may be associated with a failed operating status of the component of the vehicle, or of a same or similar component of another vehicle.

In various examples, actual conditions associated with vehicle components may be measured over time to generate damage models associated with vehicle components. For instance, measurements associated with actual conditions experienced by vehicle components (e.g., forces, pressures, electrical currents, temperatures, etc.) may be taken over time. These measurements may be logged and evaluated over time to create a wear and/or damage model associated with the component, and the model may be compared to known operating limits (e.g., fatigue and/or stress conditions of metal, number of cycles, number of revolutions, hours of operations, etc.) to determine when components should be repaired and/or replaced, when components may likely experience a failure and/or anomaly, and the like. In at least one example, a pressure sensor may be used as a proxy for force to determine load inputs on the body of the vehicle. Additionally, stress-strain relationships may be evaluated for components of the vehicle (e.g., using Miner's rule and/or cumulative damage models).

As described herein, a machine learned model may be trained to predict an operating status associated with a component of a vehicle. By way of example, and not limitation, a method to train a machine learned model according to this application may include receiving stored sensor data previously captured by one or more sensors of a vehicle. The sensor data may include audio data, inertial measurement unit (IMU) data, temperature data, image data, voltage measurements, current measurements, and the like. In some examples, an operating status may be determined or known for the component of the vehicle that generated the sensor data. Additionally, or alternatively, an identification of the component of the vehicle that generated the sensor data may be determined or known. In at least one example, the sensor data may comprise training data. The training data may be labeled to include a designation of the ground truth operating status of the component at the time that the training data was captured (e.g., an indication of wear associated with a component of a vehicle, a time-to-failure associated with the component, an indication of an anomaly associated with the component, etc.). Additionally, or alternatively, the training data may be labeled to include a designation of the identification of the component that the training data is representative of. In various examples, the training data may include second sensor data captured by one or more other sensors of another vehicle. The second sensor data may additionally be associated with the component of the second vehicle. The designation of the ground truth may be generated manually or may be generated automatically based on historical service log data associated with the component.

In some examples, the method may include inputting the sensor data into a machine learned model and receiving, from the machine learned model, a predicted operating status associated with the component of the vehicle. By way of example and not limitation, the machine learned model may comprise and/or utilize a penalized linear regression model, a linear regression model, decision tree, logistic regression model, a support vector machine (SVM), a Naive Bayes model, a k-nearest neighbors (KNN) model, a k-Means model, a neural network, or other logic, model, or algorithm alone or in combination.

In some examples, a difference may be determined between the ground truth operating status (e.g., the measured or actual operating status) and the predicted operating status output by the machine learned model. In that case, one or more parameters of the machine learned model may be altered and/or adjusted based at least in part on the difference in order to obtain a trained machine learned model that is able to accurately predict an operating status of vehicle components that are in service.

In various examples, the sensor data may be processed and/or filtered before it is input into the machine learned model. For instance, in the case of sensor data that comprises audio data, the audio data may include at least an acoustic signature associated with the component of the vehicle and background noise. Accordingly, the method may include identifying the background noise of the audio data and processing at least a portion of the audio data including the background noise to generate processed audio data with less of the background noise. Additionally, processing sensor data may include setting limits for a signal-to-noise ratio of the sensor data, setting a target frequency of the sensor data, including performing fast Fourier transform (FFT) processing on the sensor data to transform the sensor data from a time domain to a frequency domain, and the like. Accordingly, in at least some examples, the processed audio data may be input into the machine learned model.

In some examples, the machine learned model may predict a location of the component that generated the sensor data. For instance, in examples in which the one or more sensors of the vehicle include an array of microphones, the machine learned model may predict locations of components that generated audio sensor data. By way of example, if a component generates audio data, then a first audio signal strength of a first microphone of the array may be greater than a second audio signal strength of a second microphone of the array (and so on) based in part on the first microphone being located closer to the component than the second microphone. In this way, based on the respective signal strengths, a predicted location of the component of the vehicle associated with generating the audio data may be predicted. Additionally, the machine learned model may predicted an identity of the component associated with generating the audio data based at least in part on the predicted location of the component.

In various examples, a trained machine learned model may be used in an inference mode (e.g., during operation of the vehicle) to predict an operating status of a vehicle component. For instance, second sensor data may be captured by the one or more sensors of the vehicle and input into the trained machine learned model continuously, periodically, and/or in response to one or more conditions. In this way, the trained machine learned model may output the operating status associated with the component of the vehicle (e.g., a predicted operating status that is the same as the actual and/or measured operating status of the component).

The example techniques described in this application, including the example methods described above, may be implemented as a method performed by vehicles, vehicle computing devices, robots, remote computing systems associated with vehicles, machine-learned models, and the like. Additionally, or alternatively, the example techniques described herein may be implemented as a system that comprises one or more processors and one or more computer-readable media storing instructions that, when executed by the one or more processors, cause the system to perform one or more of the various operations of the example techniques. Additionally, or alternatively, the example techniques described herein may be implemented as a non-transitory computer-readable storage medium storing instructions that, when executed by a computing device (e.g., processor, vehicle computing device, remote computing system, etc.), cause the computing device to perform one or more of the various operations of the example techniques.

While some of the examples described herein refer to using audio data to detect operational state of vehicle components, in some examples, other types of sensor data may be used in addition to or instead of audio data to monitor operational state of the vehicle and/or components of the vehicle. For instance, outputs of any of the other types of sensors described herein may be used in addition to or instead of audio data to generate sensor signatures, as inputs to machine learned models, or the like.

These and other aspects are described further below with reference to the accompanying drawings. The drawings are merely example implementations and should not be construed to limit the scope of the claims. For example, while the example vehicles are shown and describe as being autonomous vehicles that are capable of navigating between locations without human control or intervention, techniques described herein are also applicable to non-autonomous and/or semi-autonomous vehicles. Also, while the example vehicles are illustrated as having coach style seating, other seating configurations are contemplated. Vehicles according to this application may be configured to hold any number of passengers (e.g., 0, 1, 2, 3, 4, 5, 6, 7, 8, etc.). Additionally, while the examples shown include a passenger compartment, in other examples the vehicle may not have a passenger compartment (e.g., in the case of a cargo vehicle, delivery vehicle, construction vehicle, etc.). Additionally, the techniques described herein are applicable to land vehicles, aerial vehicles, water vehicles, robots, and the like.

Example Vehicle Architecture

FIG. 1 is a schematic view of an example vehicle 100 including a plurality of sensors 102A-102N (hereinafter referred to collectively as "sensors 102") (where N represents any number greater than or equal to one). In this example, the vehicle 100 is a bidirectional, autonomous vehicle that is capable of navigating between locations without human control or intervention. As used herein, a bidirectional vehicle is one that is configured to switch between traveling in a first direction of the vehicle and a second, opposite, direction of the vehicle. In other words, there is no fixed "front" or "rear" of the vehicle 100. Rather, whichever longitudinal end of the vehicle 100 is leading at the time becomes the "front" and the trailing longitudinal end becomes the "rear." However, as discussed above, the techniques described herein may be applied to vehicles other than bidirectional vehicles, including autonomous, semi-autonomous, or manually driven vehicles, and robots, and the like.

As shown in FIG. 1, sensors 102 may be disposed on an exterior of the vehicle 100 and in various locations. In the illustrated example, the sensors 102 include a first sensor 102A, a second sensor 102B, and a third sensor 102C disposed in an array on a first lateral side (the side shown in FIG. 1) of the vehicle 100 above a door opening. A fourth sensor 102D and a fifth sensor 102E are disposed on the first lateral side near a top of the vehicle at leading and trailing ends of the vehicle, respectively. A sixth sensor 102F, a seventh sensor 102G, an eighth sensor 102H, and a ninth sensor 102N are disposed along the first lateral side at an elevation below the fourth sensor 102D and the fifth sensor 102E. In this example, the fourth sensor 102D and the sixth sensor 102F are generally disposed at a first corner of the vehicle, while the fifth sensor 102E and the ninth sensor 102N are disposed at a second corner of the vehicle 100. The seventh sensor 102G is disposed on an exterior of a first door panel 104A and the eighth sensor 102H is disposed on an exterior of a second door panel 104B, in this example. While not shown in FIG. 1, additional sensors may be disposed at similar locations on the opposite lateral side of the vehicle 100. By way of example and not limitation, the sensors 102 may include one or more microphones, surface acoustic wave (SAW) sensors, inertial measurement units (IMUs), temperature sensors, image sensors (e.g., cameras), lidar sensors, radar sensors, time-of-flight (TOF) sensors, sonar sensors, pressure sensors, strain gauges, humidity sensors, geolocation sensors (e.g., GPS sensors), environmental sensors, piezoelectric sensors, accelerometers, air quality sensors, electrical voltage sensors, electrical current sensors, and the like. Additionally, the sensors 102 may include multiple different types of sensors, such as a first sensor may comprise a first sensor type (e.g., microphone), a second sensor may comprise a second sensor type (e.g., an IMU), and the like. In some examples, a sensor may comprise one or more sensor types (e.g., a sensor that is both a microphone and an image sensor). The vehicle 100 may include more or less sensors than are shown in FIG. 1. For instance, although depicted in FIG. 1 as including multiple sensors 102, the vehicle 100 may, in some examples, include only a single sensor. Additionally, the locations of the sensors 102 on the vehicle 100 are for illustrative purposes, and it is contemplated that the sensors 102 may be disposed at different locations of the vehicle 100 than the locations shown in FIG. 1, including in the interior and/or exterior of the vehicle 100.

The sensors 102 of the vehicle may be used for a variety of purposes. For example, at least some of the sensors 102 (e.g., image sensors, lidar sensors, radar sensors, etc.) may provide sensor data to a perception system of the vehicle to allow the vehicle to detect and classify objects in an environment of the vehicle and/or to localize the vehicle's position in the environment. As another example, at least some of the sensors 102 (e.g., GPS sensors, IMUs, etc.) may provide location and/or motion data of the vehicle to the perception system, a navigation system, or other systems of the vehicle. Additionally, or alternatively, at least some of the sensors 102 may be used to capture input from a user of the vehicle (e.g., verbal, touch, and/or gesture commands provided by a passenger of the vehicle) to control or interact with the vehicle. In some examples, any or all of these sensors may also be used to capture data associated with operation of components of the vehicle. In this way, in some examples, existing sensors of a vehicle may be leveraged to monitor the operating status of the vehicle or components of the vehicle. In some examples, the sensors 102 may also include additional sensors specifically designed and positioned to capture data associated with operation of components of the vehicle.

In some examples, an array of sensors, such as sensors 102A, 102B, and 102C, may be used. In such examples, the sensors 102 in the array may be used to determine directionality associated with the sensor data. By way of example, if the array of sensors comprises an array of microphones for capturing audio data produced by vehicle components, then the audio data captured by the array of microphones may be used to determine a location of the component that produced the audio data and/or to discriminate between different components to which the audio data could be attributable. For instance, if a first microphone of the array is closer to the component than a second microphone of the array, then first audio data captured by the first microphone may include a stronger audio signal than second audio data captured by the second microphone, and so on. As such, based on the differing signal strength in the first audio data, the second audio data, third audio data, and so on, a direction and/or location of the component that produced the audio data may be determined. In additional or alternative examples, a sensor may be disposed in each of four quadrants of the vehicle 100 to localize components. For instance, a first microphone may be located in a first quadrant of the vehicle 100 (e.g., front and left quadrant), a second microphone may be located in a second quadrant of the vehicle 100 (e.g., front and right quadrant), a third microphone may be located in a third quadrant of the vehicle 100 (e.g., rear and left quadrant), and a fourth microphone may be located in a fourth quadrant of the vehicle 100 (e.g., rear and right quadrant). In the context of this "quadrant" terminology, the term "front" refers to a first end of the vehicle (which, in the case of a bidirectional vehicle, may be either the leading end or the trailing end of the vehicle) and "rear" refers to a second end of the vehicle opposite the front/first end.

In some examples, one or more sensors, such as sensors 102G and 102H, may be located on the vehicle 100 proximate to one or more components. In the example of FIG. 1, sensors 102G and 102H are disposed on door panels 104A and 104B, respectively. In this way, sensor 102G and/or sensor 102H may, in at least one example, capture data indicating whether or not the door panels 104A and 104B are operating correctly. For instance, sensors 102G and/or 102H may capture sensor data indicating that one or more of the door panels 104A and/or 104B are experiencing vibrations. As such, this sensor data indicating the vibrations may be used to determine that one or more of the door panels 104A and/or 104B is not properly closing (e.g., one or both of the door panels is ajar, is out of its track, is blocked by an object, etc.). Additionally, or alternatively, the sensor data may indicate that one or more of the door and/or window seals 106A, 106B, and 106C are not sealing properly (e.g., one of the seals is worn or failed). Additionally, or alternatively, the sensor data may include audio from other nearby components, such as a wheel of the vehicle, which may indicate a condition of the nearby component (e.g., a tire wear condition, a condition of a brake, etc.).

Figure 2:
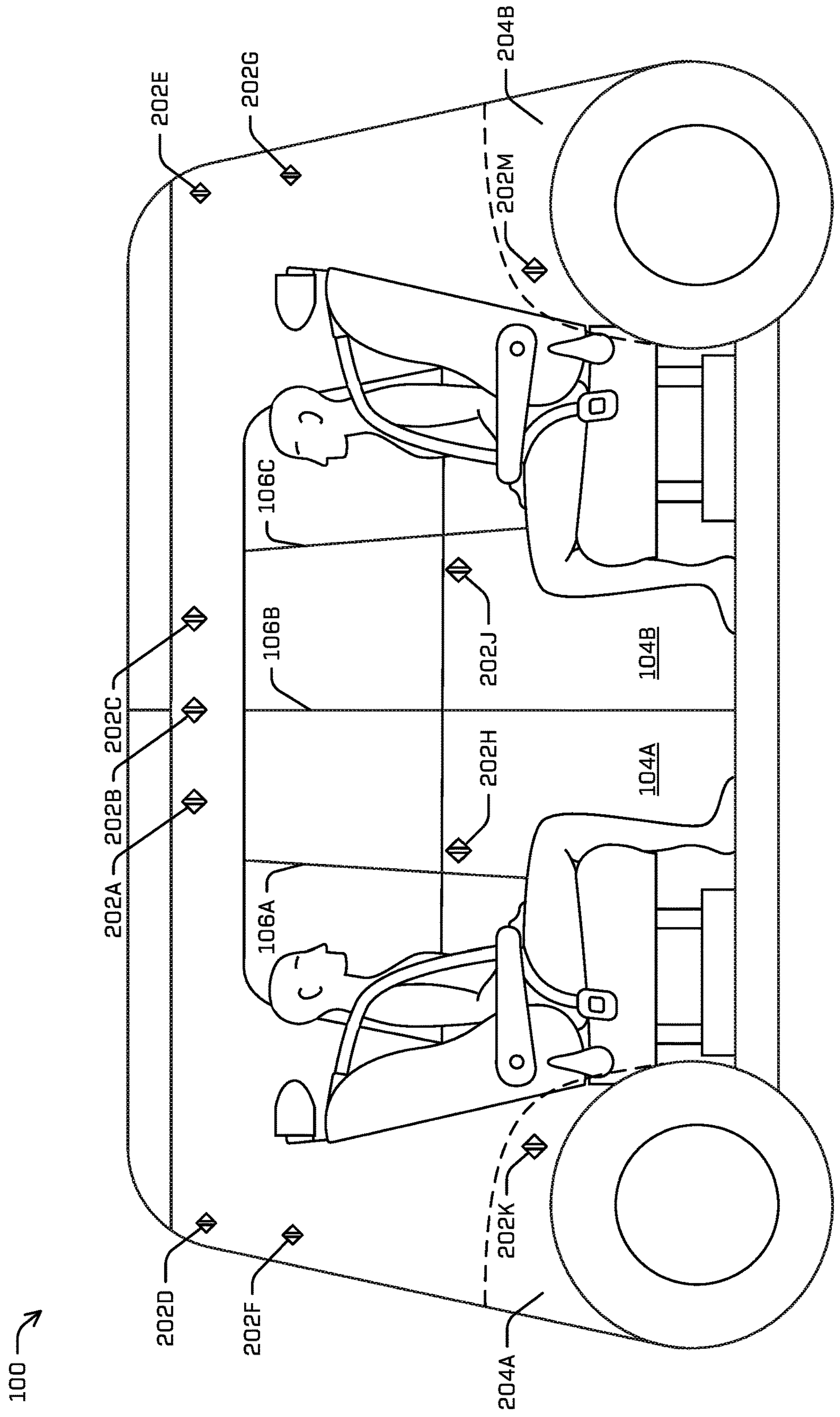
FIG. 2 is a schematic view of an example vehicle interior including a plurality of sensors.

FIG. 2 is a schematic view of an example interior of a vehicle, such as vehicle 100, including a plurality of interior sensors 202A-202M (collectively "interior sensors 202", where M is any integer greater than or equal to one). In the illustrated example, the interior sensors 202 include a first sensor 202A, a second sensor 202B, and a third sensor 202C disposed in a roof, headliner, or trim piece of the vehicle 100. In some examples, the first sensor 202A, second sensor 202B, and third sensor 202C may be arranged in an array longitudinally along a centerline of the vehicle 100. A fourth sensor 202D and a fifth sensor 202E are disposed on the first lateral side near a top of a passenger compartment of the vehicle at leading and trailing ends of the vehicle, respectively. While not shown, similar sensors can be disposed on a second, opposite, lateral side of the vehicle. A sixth sensor 202F and a seventh sensor 202G are disposed in the passenger compartment on the leading and trailing ends, respectively, at approximately head or shoulder height of passengers. An eighth sensor 202H is disposed on an interior of the first door panel 104A and a ninth sensor 102J is disposed on an exterior of the second door panel 104B, in this example. A tenth sensor 202K and an eleventh sensor 202M are disposed proximate one or more mechanical systems or components of the vehicle. While not shown in FIG. 2, additional sensors may be disposed at similar locations on the opposite lateral side of the vehicle 100. In some examples, the interior of the vehicle 100 may include more or less sensors than are shown in FIG. 2. For instance, although depicted in FIG. 2 as including multiple sensors 202, the vehicle 100 may, in some examples, include only a single sensor. Additionally, the locations of the sensors 202 in the interior of the vehicle 100 are for illustrative purposes, and it should be understood that the sensors 202 may be disposed at different locations of the vehicle 100 than the locations shown in FIG. 2.

In this example, the vehicle 100 includes detachable drive assemblies 204A and 204B (collectively "drive assemblies 204"). In some examples, the vehicle 100 may be constructed so that substantially all major systems and/or components of the vehicle are located on the drive assemblies 204. For instance, each drive assembly 204 may include some or all of the following: a propulsion system, power supply system (including battery, fuel cell, combustion engine, or the like) and related electronics, steering system, braking system, suspension system, HVAC system, wheel and tire assemblies, and related controls and actuators for the forgoing systems. In some examples, the drive assemblies 204 may also include exterior lighting, body panels, facia, and/or sensors, such as the sensors 202K and 202M. In other examples that do not include detachable drive assemblies, the sensors 202 and any or all of these systems or components may be coupled to a frame or body of a vehicle.

In some examples, the sensors 202 may capture sensor data associated with one or more components of the respective drive assembly 204. The sensor data may include one or more types of sensor data, such as audio data, video data, IMU data, temperature data, or data associated with any of the other types of sensors described herein. The sensor data may be representative of or associated with one or more different components of the vehicle. For instance, the sensor data may comprise audio data indicating that the brake system is squealing, IMU data indicating that a constant-velocity (CV) joint of the vehicle is vibrating or knocking, audio data indicating that a compressor bearing of the HVAC system is failing, etc. In some examples, the sensors 202 may comprise an array of sensors, such as sensors 202A, 202B, and 202C. In this way, the sensor data may be used to determine which the drive assemblies 204, drive assembly 204A or drive assembly 204B is associated with producing the sensor data.

The drive assemblies 204 in this example are removable and can be easily removed and replaced with a different drive assembly in the event of a worn or faulty component. The component(s) of the drive module can then be serviced based on sensor signatures determined from the sensor data associated with components of the drive assembly. In several examples, based on determining operating statuses associated with components of the vehicle 100 as described herein, a drive assembly may be swapped out for a drive assembly containing new brake systems, new power units, new HVAC systems, new sensor systems, or the like. In one example, based at least in part on determining that a braking system of a drive assembly has a degraded operating status (e.g., based on an audio sensor signature corresponding to brake squeal), a new braking system may be installed in the drive assembly, or the existing braking system may be serviced. In another example, a sensor signature (e.g., based on a voltage sensor, current sensor, temperature sensor, and/or other sensors) may indicate that a battery is malfunctioning (e.g., is not charging fully, is over charging, is over temperature, etc.) and needs to be replaced.

As discussed above with reference to FIG. 1, the vehicle 100 includes door panels 104A and 104B (collectively referred to as "door panels 104") and door and/or window seals 106A, 106B, and 106C (collectively referred to as "door/window seals 106"). The door/window seals 106 seal the door and/or window seams of the vehicle 100 such that outside elements, such as rain, water, snow, mud, gasses, odors, etc., do not enter the interior of the vehicle 100 through the door and/or window seams. Additionally, the door/window seals 106 may insulate the door and/or window seams such that noise, cold air, warm air, etc. does not enter the interior of the vehicle 100 through the door and/or window seams. By way of example, the door/window seals 106 may comprise rubber, plastic, silicon, fabric, composites thereof, or other materials to fill the seam between the door panels 104 and the vehicle body and/or between the windows and the door panels 104.

In some examples, the sensors 202 may capture senor data associated with the door/window seals 106 to determine condition and/or operating statuses associated with the door seals 106. For example, the sensors 202 may capture audio data representing ambient noise associated with the interior of the vehicle 100 while the vehicle 100 is traversing on a roadway. Based on this audio data, a progressive (e.g., second) sensor signature may be determined for the ambient noise in the interior of the vehicle 100. This progressive sensor signature may be compared to a baseline (e.g., first) sensor signature associated with the ambient noise in the interior of the vehicle to determine an operating status associated with the door/window seals 106 (e.g., whether the door seals 106 are sealing properly). If the progressive sensor signature differs from the baseline signature by a threshold amount (e.g., a change in amplitude, frequency, and/or other characteristic), then the operating status may indicate that one or more of the door/window seals 106 has failed, is damaged, or otherwise needs service. Further, in examples in which an array of sensors 202 is used, the sensor signature may also indicate a particular door panel 104 or door/window seal 106 with which the failed operating condition is associated. In a variation of this example, the sensors 202 in this example may additionally or alternatively include pressure sensors located on the interior and/or exterior of the vehicle and the baseline and progressive sensor signatures may be based at least in part on pressure measurements taken inside and/or outside the vehicle. Again, if the progressive sensor signature differs from the baseline signature by a threshold amount (e.g., a change in absolute interior pressure, change in pressure differential between the interior and exterior of the vehicle, etc.), then the operating status may indicate that one or more of the door/window seals 106 has failed, is damaged, or otherwise needs service.

Figure 3:
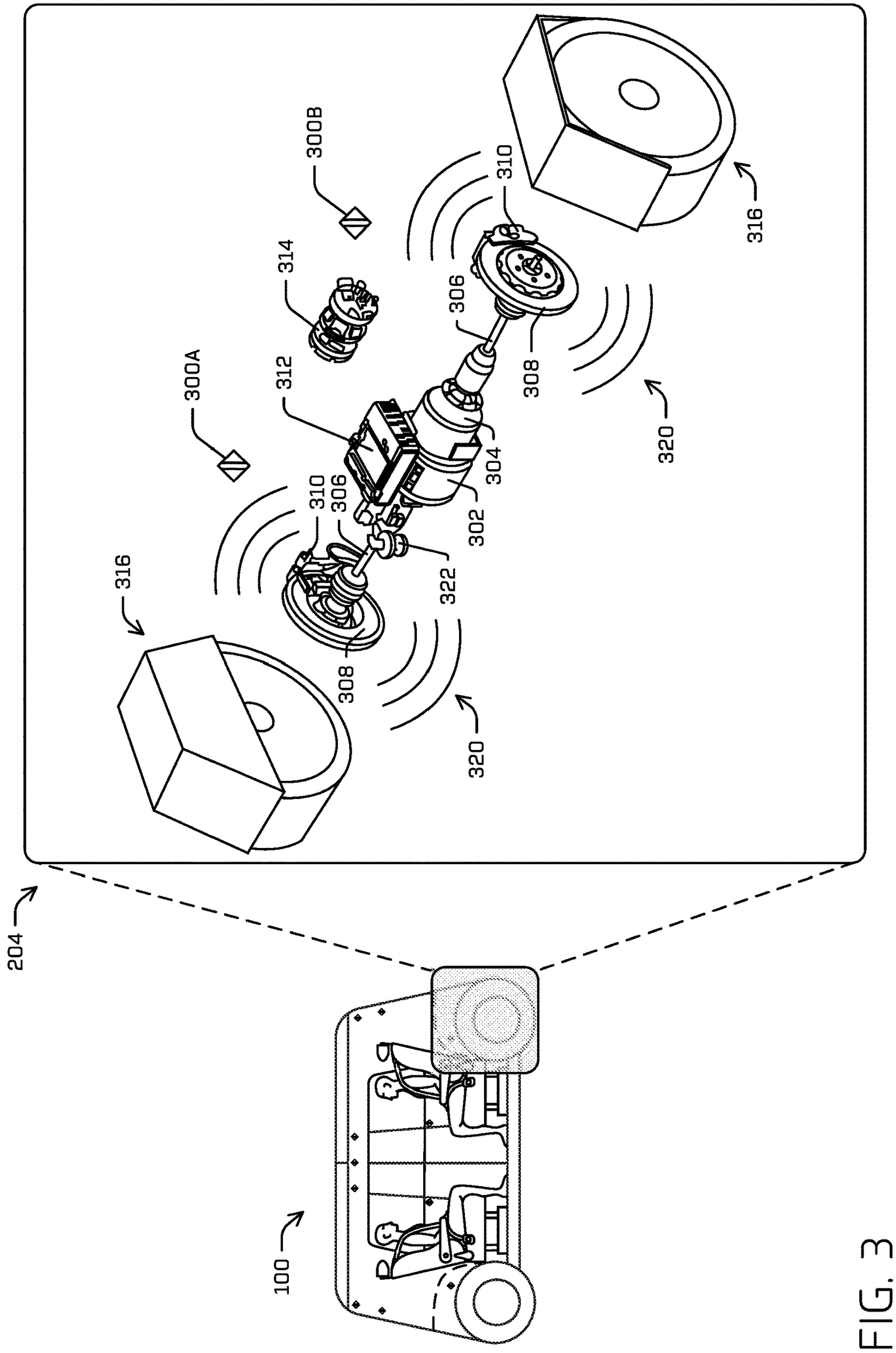
FIG. 3 is an exploded view of an example drive assembly of a vehicle including a plurality of components.

FIG. 3 is an exploded view of an example drive assembly of a vehicle, such as drive assembly 204 of vehicle 100, including a plurality of components and one or more sensors. In the illustrated example, the drive assembly 204 includes a first sensor 300A and a second sensor 300B (collectively referred to as "sensors 300") located in proximity individual components or systems of the drive assembly 204. In the illustrated example, the drive assembly 204 includes a propulsion system (including a drive motor 302, gear box 304, axles 306), a braking system (including rotor disks 308 and calipers 310), a power system (including inverter 312), an HVAC system (including air-conditioning compressor 314), coolant system (including coolant pump 322), wheel assemblies 316, and a sensor system (including sensors 300).

In examples, the sensors 300 (and/or sensors 102 and/or sensors 202) may capture sensor data associated with any of the various components of the drive assembly 204 and/or other components of the vehicle 100. By way of example, and not limitation, at least one of the 300 (and/or sensors 102 and/or sensors 202) may comprise an audio sensor (e.g., microphone) that captures audio data representative of soundwaves 320. In some examples, the soundwaves 320 may be emitted by the braking system upon activating the braking system to decelerate the vehicle 100. Additionally, in some examples, the sensors 300 (and/or sensors 102 and/or sensors 202) may capture inertial sensor data indicating that one of the components of the propulsion system (e.g., the drive motor 302, the gear box 304, and/or the axles 306) is vibrating, which may indicate wear or failure of the respective component(s). In some examples, the sensors 300 (and/or sensors 102 and/or sensors 202) may include image sensors to capture image data indicating that a position of one or more components of the propulsion system is out of alignment and needs to be adjusted, replaced, or otherwise serviced. As yet another example, the sensors 302 (and/or sensors 102 and/or sensors 202) may capture sensor data (e.g., audio data, temperature data, pressure data, combinations of these, and/or other data) associated with a component of the HVAC system, such as the air-conditioning compressor 314, condenser, heat exchanger, and/or a ventilation fan (not shown). The foregoing are but a few examples of sensors and sensor data that can be used to monitor operating conditions of components of a vehicle according to the techniques described herein.

Example System Architecture

Figure 4:
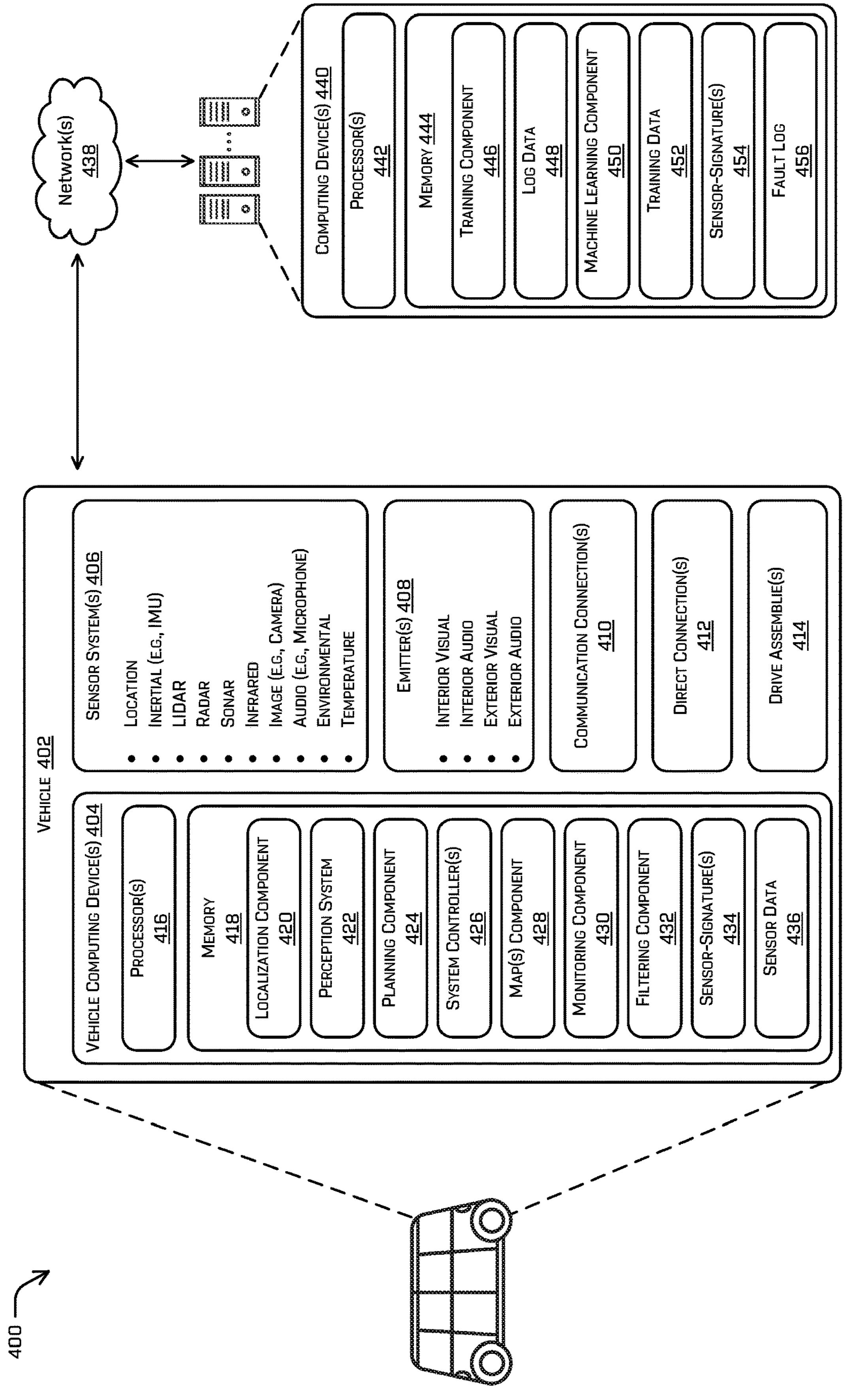
FIG. 4 is a block diagram of an example system for implementing the techniques described herein.

FIG. 4 is a block diagram of an example system 400 for implementing the techniques described herein. In some examples, the system 400 may include one or multiple features, components, and/or functionality of examples described herein with reference to other figures, such as FIGS. 1, 2, 3, etc.

The system 400 may include a vehicle 402. In some examples, the vehicle 402 may include some or all of the features, components, and/or functionality described above with respect to vehicle 100. For instance, the vehicle 402 may comprise a bidirectional vehicle. As shown in FIG. 4, the vehicle 402 may also include a vehicle computing device 404, one or more sensor systems 406, one or more emitters 408, one or more communication connections 410, one or more direct connections 412, and/or one or more drive assemblies 414.

The vehicle computing device 404 can, in some examples, include one or more processors 416 and memory 418 communicatively coupled with the one or more processors 416. In the illustrated example, the vehicle 402 is an autonomous vehicle; however, the vehicle 402 could be any other type of vehicle (e.g., automobile, truck, bus, aircraft, watercraft, train, etc.), or any other system having components such as those illustrated in FIG. 4 (e.g., a robotic system, an automated assembly/manufacturing system, etc.). In examples, the one or more processors 416 may execute instructions stored in the memory 418 to perform one or more operations on behalf of the one or more vehicle computing devices 404.

The memory 418 of the one or more vehicle computing device 404 stores a localization component 420, a perception system 422, a planning component 424, one or more system controllers 426, a map(s) component 428, a monitoring component 430, a filtering component 432, one or more sensor signatures 434 associated with one or more components of the vehicle 402, and/or sensor data 436. Though depicted in FIG. 4 as residing in memory 418 for illustrative purposes, it is contemplated that the localization component 420, perception system 422, planning component 424, one or more system controllers 426, map(s) component 428, monitoring component 430, filtering component 432, one or more sensor signatures 434 associated with one or more components of the vehicle 402, and/or sensor data 436, can additionally, or alternatively, be accessible to the vehicle 402 (e.g., stored on, or otherwise accessible from, memory remote from the vehicle 402, such as memory 444 of one or more computing devices 440).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 406 or received from one or more other devices (e.g., computing devices 440) to accurately determine a location of the autonomous vehicle. In some instances, the localization component 420 can provide data to various components of the vehicle 402 to determine an initial position of the autonomous vehicle for generating a trajectory and/or for determining to retrieve map data.

In some instances, the perception system 422 can include functionality to perform object tracking, detection, segmentation, and/or classification. In some examples, the perception system 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional and/or alternative examples, the perception system 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 424 can determine a path for the vehicle 402 to follow to traverse through an environment. For example, the planning component 424 can determine various routes and trajectories and various levels of detail. For example, the planning component 424 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate. In some examples, the planning component 424 can generate instructions to control the vehicle 402 to perform one or more operations during a test mode during which sensor signatures are generated for one or more components of the vehicle. For instance, the planning component 424 may guide the vehicle to travel at a constant speed for a period of time while the component(s) are activated so that sound signatures for the component can be captured while the vehicle is traveling at the constant speed.

In at least one example, the vehicle computing device 404 can include one or more system controllers 426, which can be configured to control steering, propulsion, braking, safety, emitters, communication, components, and other systems of the vehicle 402. These system controller(s) 426 can communicate with and/or control corresponding systems of the drive assembly(s) 414 and/or other components of the vehicle 402.

In some examples, the vehicle 402 may control operation of one or more components in order to monitor their condition using one or more sensors of the sensor system 406 (e.g., sensors 102, 202, and/or 300 of vehicle 100) and to generate sensor signatures associated with the component(s). In some examples, the vehicle computing device 404 may implement a “test mode” at a first time (e.g., when the vehicle is first commissioned or when a new component is put into service). At the first time, the vehicle 402 may perform one or more operations associated with causing a component to activate under one or more conditions so that sensor data associated with the component may be captured by the one or more sensors systems 406. For example, in the case of a fan of a heating ventilation and air conditioning (HVAC) system, the system controllers 426 may control the fan to run through all of its available settings (e.g., high, medium, low, etc.) while the planning component 424 instructs one or more other system controllers 426 to control the vehicle to traverse an environment at different rates of speed, with one or more doors or windows open and closed, etc. in order to isolate the sensor signature associated with the component under various operating conditions. The planning component 424 may again cause one or more system controllers 426 to control the vehicle to implement the test mode while the sensors system(s) 406 capture sensor data to generate a second (e.g., progressive, real-time, current, etc.) sensor signature for the component of the vehicle at a second time that is subsequent to the first time. The second sensor signature may then be compared to the first sensor signature in order to determine an operating status associated with the component.

The memory 418 can further include the map(s) component 428 to maintain and/or update one or more maps (not shown) that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual “surfels” (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 402 can be controlled based at least in part on the maps. That is, the maps can be used in connection with the localization component 420, the perception system 422, and/or the planning component 424 to determine a location of the vehicle 402, identify objects in an environment, and/or generate routes and/or trajectories to navigate within an environment.

In some examples, the one or more maps can be stored on a remote computing device(s) (such as the computing device(s) 440) accessible via network(s) 438. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The monitoring component 430 is configured to monitor the condition or operating status of the vehicle as a whole and/or individual components or systems of the vehicle. The monitoring component 430 receives sensor data from the one or more sensor systems 406, and uses the sensor data to estimate current, and/or predict future, operating statuses associated with one or more components of the vehicle 402 and/or drive assemblies 414. The monitoring component 430 can monitor the condition of virtually any component of the vehicle. A few illustrative examples of the range of components that can be monitored by the monitoring component 430 include propulsion systems (e.g., motors, gear boxes, drive train, etc.), energy storage systems (e.g., batteries, fuel cells, combustion engines, etc.), braking systems, steering systems, door seals, HVAC systems, cooling systems, computing systems, etc. As discussed above, an operating status may include, among other things, an indication of wear associated with a component of a vehicle, such as a percentage of life used and/or remaining of the component (e.g., 50% life used, 75% life remaining, etc.), a time-to-failure associated with the component, such as an amount of time and/or a distance the vehicle may travel until the component will likely fail (e.g., 10 hours until component failure, 100 miles until component failure, etc.), or an indication of an anomaly associated with the component, such as one or more fault conditions. For instance, the monitoring component 430 may receive audio data from the sensor data 436 captured by an audio sensor (e.g., microphone) of the sensor system(s) 406, and predict a component of the vehicle 402 associated with the audio data, a location of the component associated with the audio data, and/or an operating status associated with the component. The prediction can be made based on a single audio data recording or multiple audio data recordings.

The memory 418 of the vehicle computing devices 404 may further include a filtering component 432 to filter and/or process sensor data captured by the sensor systems 406. As an example, the filtering component 432 may process audio data captured by an audio sensor of the vehicle 402 to remove background noise associated with the audio data. For instance, if audio data comprises an audio signature associated with a component of the vehicle 402 and background noise, the filtering component 432 may identify the audio signature associated with the component to filter out at least some of the background noise. Additionally, or alternatively, the filtering component 432 may identify the background noise of the audio data with respect to the audio signature of the component and remove at least some of the background noise from the audio data. Although the filtering component 432 is described with respect to filtering audio signals, the filtering component 432 may filter any type of sensor data received from the various sensors of the vehicle 402, such as image sensor data, inertial sensor data, temperature sensor data, pressure sensor data, environmental sensor data, and the like.

In some examples, the memory 418 may store one or more sensor signatures 434 associated with components of the vehicle 402. Additionally, or alternatively, the sensor signatures 434 may be associated with components of other vehicles different than the vehicle 402. The sensor signatures 434 may include various types of sensor signatures for various components of the vehicle 402. For instance, the sensor signatures 434 may include one or more audio sensor signatures associated with a specific component of a vehicle (e.g., brake system), and one or more image sensor signatures associated with the same specific component, or a different component (e.g., HVAC system). In some examples, the sensor signatures 434 may include one or more baseline sensor signatures associated with components of the vehicle 402, and may additionally, or alternatively, include one or more progressive sensor signatures (e.g., a sensor signature that keeps being updated throughout the respective lifespan of the component) associated with components of the vehicle 402. In this way, the sensor signatures 434 may be used to determine operating statuses associated with components of the vehicle 402.

In some examples, the sensor signatures 434 may be sent to the computing devices 440 via the networks 438. Additionally, or alternatively, the sensor signatures 434 may be received from the computing devices 440 via the networks 438.

The memory 418 may also store sensor data 436 captured by one or more sensors of the sensor systems 406 of the vehicle 402. The sensor data 436 may include raw sensor data (e.g., sensor data that is captured by a sensor of the vehicle 402) and/or processed sensor data (e.g., sensor data that is processed by the filtering component 432 after being captured by a sensor). The sensor data 436 may be used to determine one or more of the sensor signatures 434 described above. Additionally, or alternatively, the sensor data 436 may be used to determine operating statuses associated with components of the vehicle 402. In some examples, the sensor data 436 may be sent to the computing devices 440 via the networks 438 to be used as log data 448 and/or training data 452.

In some instances, aspects of some or all of the memory-stored components discussed herein can include any models, algorithms, and/or machine learning algorithms. For example, in some instances, components in the memory 418 (and the memory 444, discussed in further detail below) such as the perception system 422, planning component 424, monitoring component 430, and filtering component 436 can be implemented as a neural network. For instance, the monitoring component 430 may comprise a machine learned model (e.g., neural network) which has been trained to predict operating statuses of one or more components of the vehicle 402.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 406 can include multiple instances of each of these or other types of sensors. In some instances, locations of individual sensors of the sensor system(s) 406 can correspond to the locations of exterior sensors 102A-102N of FIG. 1 and/or interior sensors 202A-M of FIG. 2, respectively. For instance, the lidar sensors can include individual lidar sensors located at the corners, front, back, sides, and/or top of the vehicle 402. As another example, the image sensors can include multiple image sensors disposed at various locations about the exterior and/or interior of the vehicle 402. As an even further example, the audio sensors can include multiple audio sensors disposed at various locations about the exterior and/or interior of the vehicle 402. Additionally, the audio sensors can include an array of a plurality of audio sensors for determining directionality of audio data. The sensor system(s) 406 can provide input to the vehicle computing device 404. Additionally, or alternatively, the sensor system(s) 406 can send sensor data, via the one or more networks 438, to the one or more computing device(s) 440 at a particular frequency, after a lapse of a predetermined period of time, in near real-time, etc.

The vehicle 402 can also include one or more emitters 408 for emitting light and/or sound. The emitters 408 in this example include interior audio and visual emitters to communicate with passengers of the vehicle 402. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive assembly(s) 414. Also, the communication connection(s) 410 can allow the vehicle 402 to communicate with other nearby computing device(s) (e.g., other nearby vehicles, traffic signals, etc.). The communications connection(s) 410 also enable the vehicle 402 to communicate with a remote teleoperation computing device or other remote services.

The communications connection(s) 410 can include physical and/or logical interfaces for connecting the vehicle computing device(s) 404 to another computing device (e.g., computing device(s) 440) and/or a network, such as network(s) 438. For example, the communications connection(s) 410 can enable Wi-Fi-based communication such as via frequencies defined by the IEEE 702.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 412 of vehicle 202 can provide a physical interface to couple the one or more drive assembly(s) 414 with the body of the vehicle 402. For example, the direct connection 412 can allow the transfer of energy, fluids, air, data, etc. between the drive assembly(s) 414 and the vehicle 402. In some instances, the direct connection 412 can further releasably secure the drive assembly(s) 414 to the body of the vehicle 402.

In at least one example, the vehicle 402 can include one or more drive assemblies 414. In some examples, the vehicle 402 can have a single drive assembly 414. In at least one example, if the vehicle 402 has multiple drive assemblies 414, individual drive assemblies 414 can be positioned on opposite longitudinal ends of the vehicle 402 (e.g., the leading and trailing ends, the front and the rear, etc.). In at least one example, the drive assembly(s) 414 can include one or more sensor systems to detect conditions of the drive assembly(s) 414 and/or the surroundings of the vehicle 402. By way of example, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, image sensors, ultrasonic sensors to acoustically detect objects in the surroundings of the drive system, lidar sensors, radar sensors, audio sensors, etc. Some sensors, such as the wheel encoders can be unique to the drive assembly(s) 414. In some cases, the sensor system(s) on the drive assembly(s) 414 can overlap or supplement corresponding systems of the vehicle 402 (e.g., sensor system(s) 406).

The drive assembly(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 414 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 414. Furthermore, the drive assembly(s) 414 may also include one or more communication connection(s) that enable communication by the respective drive assembly with one or more other local or remote computing device(s).

In at least one example, the memory-stored components discussed herein can process sensor data, as described above, and can send their respective outputs, over the one or more network(s) 438, to one or more computing device(s) 440. In at least one example, the memory-stored components discussed herein can send their respective outputs to the one or more computing device(s) 440 at a particular frequency, after a lapse of a predetermined period of time, in near real-time, etc.

In some examples, the vehicle 402 can send sensor data 436 to one or more computing device(s) 440 via the network(s) 438. In some examples, the vehicle 402 can send raw sensor data to the computing device(s) 438. In other examples, the vehicle 402 can send processed sensor data and/or representations of sensor data to the computing device(s) 440. In some examples, the vehicle 402 can send sensor data to the computing device(s) 440 at a particular frequency, after a lapse of a predetermined period of time, in near real-time, etc. In some cases, the vehicle 402 can send sensor data 436 (raw or processed) to the computing device(s) 440 as one or more log files.

The computing device(s) 440 can include one or more processors 442 and memory 444 that may be communicatively coupled to the one or more processors 442. The memory 444 may store a training component 446, log data 448, a machine learning component 450, training data 452, one or more sensor signatures 454 that are associated with vehicle components, such as components of vehicle 402, and/or a fault log 456.

The log data 448 may include historical and/or pre-recorded sensor data obtained from a computing system of a vehicle (e.g., vehicle 100 and/or other vehicles, etc.), which captured and stored the sensor data during operation. The log data 448 may include raw sensor data and/or processed sensor data. The log data 448 may, in some examples, include fused perception data captured by multiple sensor systems on a vehicle, such as image sensors, lidar sensors, radar sensors, TOF sensors, sonar sensors, global positioning system sensors, audio sensors, IMUs, and/or any combination of these. The log data 448 may additionally, or alternatively, include classification data including semantic classifications of objects (e.g., pedestrians, vehicles, buildings, road surfaces, etc.) and/or components represented in the sensor data and/or track data corresponding to motion of objects classified as dynamic objects through the environment. The track data may include multiple tracks of multiple different objects over time.

The training component 446 can generate the training data 452 using the log data 448. For instance, the training component 446 can label sensor data associated with vehicle components with one or more measured parameters and/or characteristics of the vehicle components associated with the sensor data. The sensor data and/or the measured parameters or characteristics may be obtained from the log data 448, the sensor signatures 454, and/or the fault log 456. The label may include an indication of an operating status (e.g., normal, failed, time-to-failure, etc.) associated with the vehicle component (e.g., brake system, HVAC system, door/window seal, etc.) and/or any other characteristics of the vehicle component at the time the sensor data was captured and/or at one or more times subsequent to the time the sensor data was captured. For instance, the label may indicate that a component represented in the sensor data failed at later date (e.g., 100 hours after the sensor data was captured). The training component 446 can then use the training data 452 to train the machine learning component 450 to predict current and/or future operating statuses associated with vehicle components based at least in part on receiving, as an input, sensor data. Additionally, the training component 446 can use the training data 452 to train the machine learning component 450 to predict any other characteristics of vehicle components (e.g., identifying a vehicle component associated with the sensor data, a location of the component in the vehicle, an indication of an amount of wear of the component, a remaining life of the component, etc.) based on receiving sensor data inputs.

The memory 444 of the computing devices 440 may additionally, store one or more sensor signatures 454 associated with components of vehicles, such as components of the vehicle 402 and/or another vehicle. The sensor signatures 454 may include various types of sensor signatures for various components of vehicles. For instance, the sensor signatures 454 may include one or more audio/acoustic sensor signatures associated with a component of a vehicle, one or more image sensor signatures associated with the same component and/or a different component (e.g., HVAC system). The sensor signatures may be based on sensor data of a single sensor modality (e.g., audio data, or image data, or IMU data, etc.) or they may be based on data of multiple different sensor modalities (e.g., audio data, image data, IMU data, and/or other sensor data). In some examples, the sensor signatures 454 may include one or more initial or baseline sensor signatures associated with components of one or more vehicles, and may additionally, or alternatively, include one or more subsequent or progressive sensor signatures associated with components taken throughout the life of the component. In that case, the subsequent sensor signatures can be compared to the initial sensor signatures to determine change in operating status of the respective components. In this way, the sensor signatures 454 may be used to determine operating statuses associated with components of the vehicle 402, or other vehicles. In some examples, the sensor signatures 454 may be sent to the vehicle computing devices 404 via the networks 438.

In some examples, the memory 444 may include a fault log 456, and failures or anomalies associated with one or more vehicles, such as vehicle 100 and/or vehicle 402, may be recorded in the fault log 456. The fault log 456 may include an indication of the failure or anomalous measurement detected and an identifier of the component(s)/system(s) involved (e.g., a sensor signature associated with a failed operating status of a vehicle component). The fault log 456 may also store a snapshot of operating conditions leading up to the failure or anomalous measurement (e.g., a series of progressive sensor signatures over at least a portion of the lifespan of the vehicle component). Although depicted in FIG. 4 as residing in memory of the computing device 440, in at least some examples, the fault log 456 may be stored locally at the vehicle 402. In some examples, the fault log 456 may be used to label the log data 448 for use in training a machine learned model of the machine learning component 450 and/or the monitoring component 430 to predict operating status of components. Additionally, in at least some examples, the fault log 456 may be reported by the vehicle 402 to the computing devices 440. This reporting may occur periodically (e.g., daily, hourly, etc.) or upon the occurrence of certain events (e.g., detection of a collision, transit to a service location, detection of a change in operating status of a component, change in a sensor signature associated with a component, etc.).

The processor(s) 416 of the vehicle 402 and the processor(s) 442 of the computing device(s) 440 can be any suitable processor capable of executing instructions to process data and perform operations as described herein. By way of example and not limitation, the processor(s) 416 and 442 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 444 are examples of non-transitory computer-readable media. The memory 418 and 444 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 4 is illustrated as a distributed system, in alternative examples, components of the vehicle 402 can be associated with the computing device(s) 440 and/or components of the computing device(s) 440 can be associated with the vehicle 402. That is, the vehicle 402 can perform one or more of the functions associated with the computing device(s) 440, and vice versa. Further, aspects of machine learning component 450 can be performed on any of the devices discussed herein.

Example Methods

Figure 5:
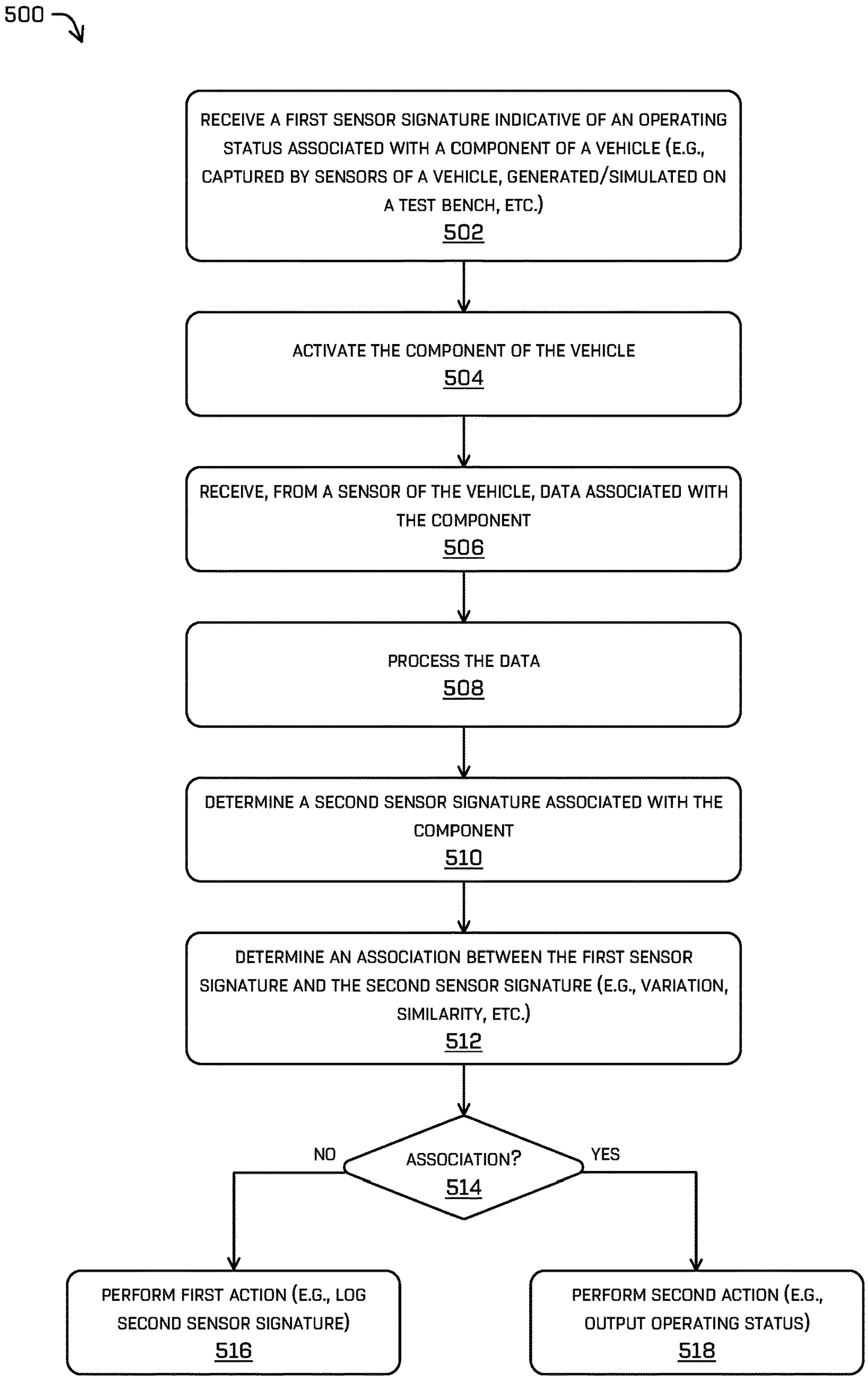
FIG. 5 is a flowchart illustrating an example method for monitoring vehicle health and/or vehicle component health.
Figure 6:
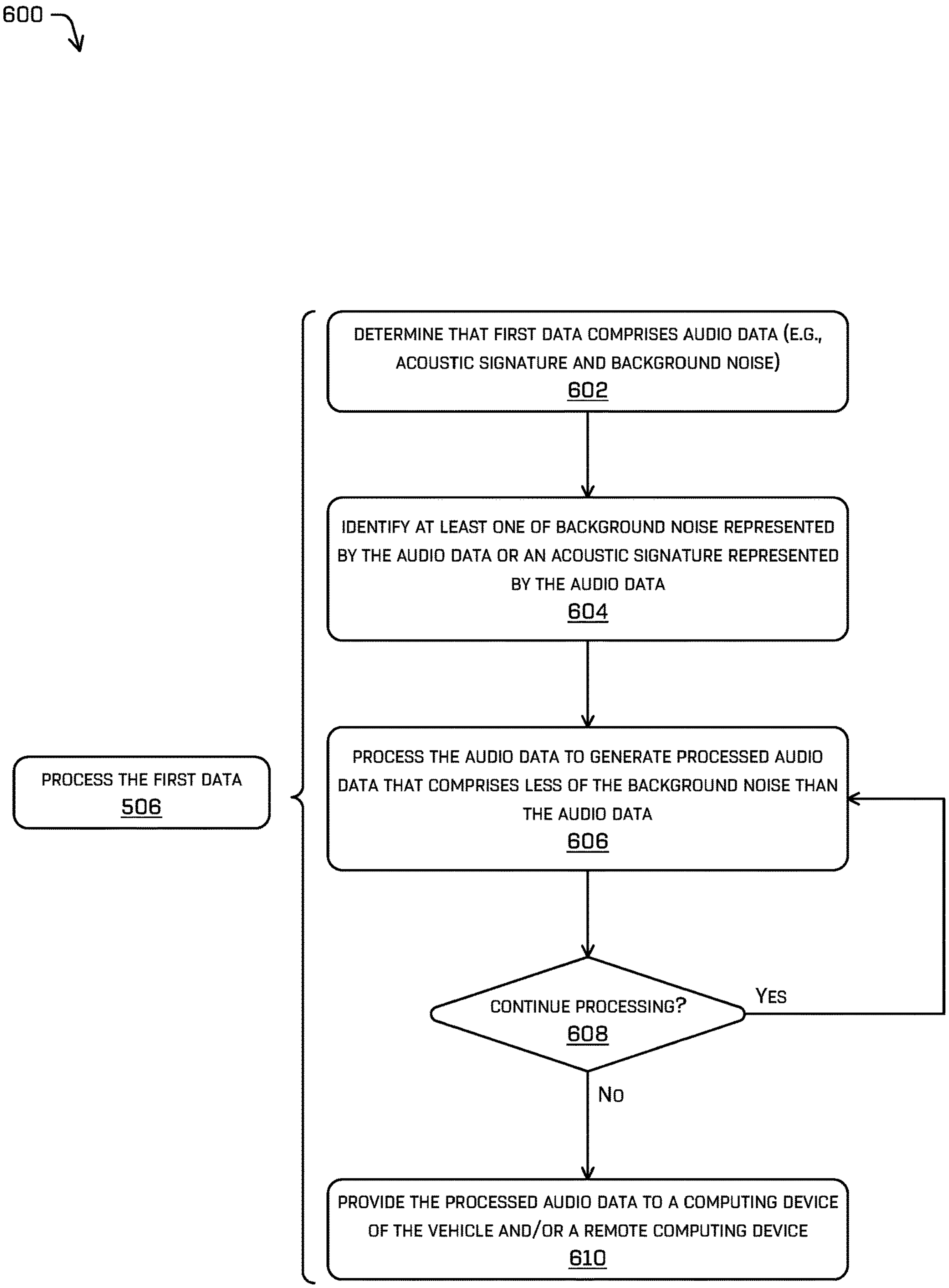
FIG. 6 is a flowchart illustrating an example method including additional details of processing sensor data.
Figure 7:
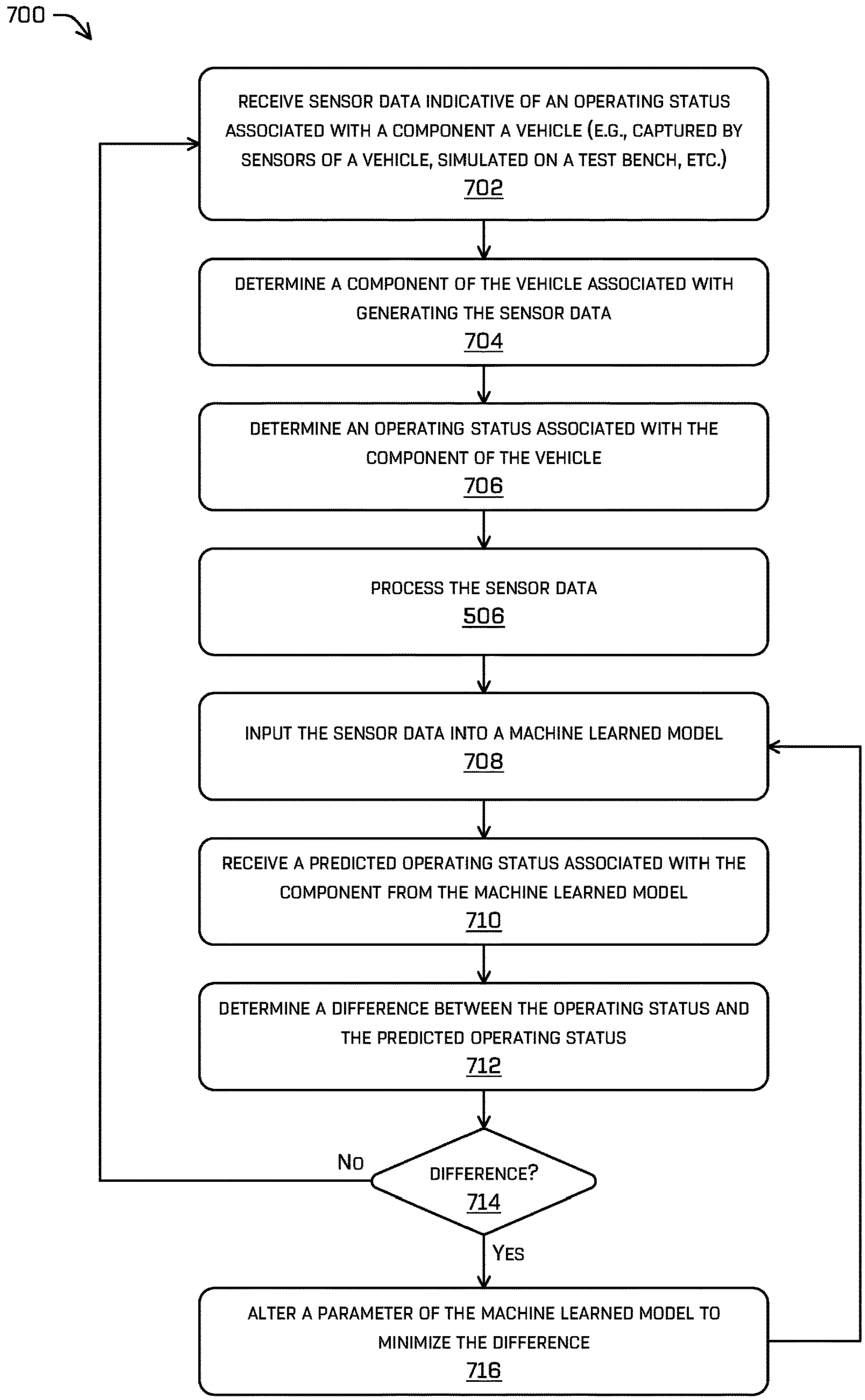
FIG. 7 is a flowchart illustrating an example method for using a machine learned model to monitor vehicle health and/or vehicle component health.

FIGS. 5, 6, and 7 are flowcharts showing example methods involving monitoring vehicle component health, processing sensor data, and using machine learned models. The methods illustrated in FIGS. 5, 6, and 7 are described with reference to one or more of the vehicles and/or computing devices shown in FIGS. 1-4 for convenience and ease of understanding. However, the methods illustrated in FIGS. 5, 6, and 7 are not limited to being performed using the vehicles and/or computing devices shown in FIGS. 1-4, and may be implemented using any of the other vehicles, computing devices, computing systems, and/or drive assemblies described in this application, as well vehicles, computing devices, computing systems, and/or drive assemblies other than those described herein. Moreover, the vehicles, computing devices, computing systems, and/or drive assemblies modules described herein are not limited to performing the methods illustrated in FIGS. 5, 6, and 7.

FIG. 5 is a flowchart illustrating an example method 500 for monitoring vehicle health and/or vehicle component health. At operation 502, the method 500 includes receiving a first sensor signature indicative of an operating status associated with a component of a vehicle. In some examples, the sensor signature may comprise log data that was captured by sensors of another vehicle that experienced a failure or other anomaly associated with the component. Additionally, or alternatively, the first sensor signature may be generated and/or simulated on a test bench. In at least one example, the first sensor signature may be determined during a test mode of a vehicle by activating the component of the vehicle and capturing sensor data associated with the component via one or more sensors of the vehicle.

At operation 504, the method 500 includes activating the component of the vehicle. By way of example, if the vehicle component that is to be activated includes the brake system, the vehicle may accelerate to a certain speed (e.g., 10 MPH, 25, MPH, etc.) and then apply the brake system to reduce the speed of the vehicle and/or bring the vehicle to a stop. As another example, if the vehicle component that is to be activated includes the HVAC system, then the vehicle may cause various HVAC system components to turn on or off, such as an air conditioning compressor, ventilation fan, etc. As yet another example, if the vehicle component that is to be activated includes the door/window seals, then the vehicle may accelerate to a certain speed and/or maintain a certain speed (e.g., 25 MPH) such that audio data corresponding to ambient noise within a passenger compartment of the vehicle can be captured. Additionally, in some examples, one or more other systems or components of the vehicle may be varied while activating the vehicle component in order to isolate a portion of sensor data attributable to the component being activated. Additionally, in some examples, multiple components may be activated in combination to identify interactions or relationships between various components. For instance, in the case of testing the door/window seals, the HVAC system may be turned on and off to determine if a change in cabin pressure affects the ability of the door/window seals to seal the passenger compartment.

At operation 506, the method 500 includes receiving, from a sensor of the vehicle, data associated with the component of the vehicle. In some examples, the sensor may comprise an audio sensor (e.g., microphone), an image sensor (e.g., camera), an inertia sensor (e.g., IMU), a temperature sensor, motion sensor, accelerometer, or any of the other sensor types described herein. Additionally, the data may comprise audio data, image data, inertia data, temperature data, pressure data, electrical voltage measurements, electrical current measurements, or any other type of sensor data described herein. The data may, in some examples, be received via one or more wired and/or wireless communication channels.

At operation 508, the method 500 includes processing the data. In some examples, the first data may comprise raw sensor data. As such, the sensor data may be processed to generate processed sensor data. In some examples, and as described in even further detail below with reference to FIG. 6, processing the sensor data may include removing and/or reducing portions of data (e.g., background noise) from the sensor data and/or isolating portions of sensor data associated with a particular component.

At operation 510, the method 500 includes determining a second sensor signature associated with the component of the vehicle. The second sensor signature may be determined based at least in part on receiving the data. In some examples, the second sensor signature may be determined based on a single capturing of sensor data, and, in additional or alternative examples, may be based on multiple instances of capturing sensor data. In some examples, the second sensor signature may comprise a progressive sensor signature that is used to compare with prior sensor data and/or sensor signatures (e.g., the first sensor signature) to determine an operating status of a vehicle component. In at least one example, the second sensor signature may comprise a progressive sensor signature that is monitored continuously, periodically (e.g., hourly, daily, weekly, monthly, etc.), or upon occurrence of a triggering event (e.g., impact with an object, charging, servicing of the component, the vehicle being offline or not currently in use, etc.) throughout the lifespan of the vehicle component.

At operation 512, the method 500 includes determining an association between the first sensor signature and the second sensor signature. In some examples, determining the association may include determining at least one of a variation or a similarity between the first sensor signature and the second sensor signature. Determining the association may include comparing the first sensor signature and the second sensor signature to determine at least one of a variation or a similarity. At operation 514, the method 500 includes determining whether the association exists (e.g., whether a variation is greater than a threshold variation, whether a similarity is within a threshold range, etc.). If an association between the first sensor signature and the second sensor signature does not exist, is insignificant, or is otherwise not within a threshold range, then the method 500 may proceed on to operation 516. However, if the association between the first sensor signature and the second sensor signature does exist, then the method 500 may proceed on to operation 518.

At operation 516, the method 500 may include performing a first action. In some examples, performing the first action may include sending a notification to a remote computing system that an operating status of the vehicle component has changed, but that the change is not significant. Additionally, or alternatively, the first action may include logging or storing the second sensor signature and/or the second data in a memory of the vehicle (e.g., memory 418 of vehicle computing device 404) or a memory of a computing system and/or device that is remote from the vehicle and accessible by the vehicle (e.g., memory 444 of computing device 440).

At operation 518, the method 500 may include performing a second action. In some examples, the second action may include determining and/or outputting an operating status associated with the component of the vehicle. As discussed above, the operating status may include an indication of wear associated with a component of a vehicle, such as a percentage of life used and/or remaining of the component (e.g., 50% life used, 75% life remaining, etc.), a time-to-failure associated with the component, such as an amount of time and/or a distance the vehicle may travel until the component will likely fail (e.g., 10 hours until component failure, 100 miles until component failure, etc.), or an indication of an anomaly associated with the component, such as one or more fault conditions. In some examples, determining the operating status and/or the estimated time until failure may be based at least in part on the data, the second sensor signature, the association between the first sensor signature and the second sensor signature, an amount of time the component of the vehicle has been in service, a number of miles the vehicle has driven with the vehicle component installed, etc. For instance, a look up table may be stored that associates respective ones of sensor signatures with respective ones of operating statuses of a component, average times-to-failure, etc. In this way, a sensor signature of the look up table may be identified based at least in part on the second sensor signature, and a corresponding operating status, time-to-failure, etc. may be determined. In at least one example, performing the second action may include sending the operating status to the remote computing system. In some examples, the remote computing system may be associated with a remote monitoring system that monitors a fleet of autonomous vehicles.

FIG. 6 is a flowchart illustrating an example method 600 including additional details of processing sensor data at operation 506. As discussed above, at operation 506 the method 500 may include processing sensor data. In some examples, the sensor data 506 may comprise raw sensor data. As such, the sensor data may be processed to generate processed sensor data. Additionally, the processed sensor data may be used to determine one or more characteristics associated with the sensor data. For instance, the processed sensor data may be used to determine a type of the sensor data (e.g., audio data, image data, etc.).

At operation 602, the method 600 may include determining that the sensor data comprises audio data. As shown, the audio data may, in some examples, represent at least an acoustic signature associated with the vehicle component and background noise. By way of example, and not limitation, the audio data may represent an acoustic signature associated with a brake system squeal and background noise associated with, for instance, other vehicle components, environment noise, noise of pedestrians proximate the vehicle, noise of other vehicles, etc.

At operation 604, the method 600 may include identifying at least one of the background noise represented by the audio data or the acoustic signature associated with the vehicle component. In some examples, identifying the background noise and/or the acoustic signature may be based at least in part on a condition associated with the vehicle. As an example, if the vehicle is activating the brake system to decelerate the vehicle, then the vehicle computing device may be aware that audio data may comprise an acoustic signature associated with the brake system. As such, the vehicle computing device may use this information to identify the acoustic signature of the audio data so that the audio data can be processed.

At operation 606, the method 600 may include processing the audio data to generate processed audio data that comprises less of the background noise than the raw sensor data. In some examples, processing the audio data may comprise processing at least a portion of the audio data including at least one of the background noise and/or the acoustic signature of the component. Additionally, or alternatively, processing the audio data may comprise processing a portion of the audio data that includes only the background noise or the acoustic signature.

At operation 608, the method 600 may include determining whether to continue processing the audio data. For instance, the audio data may be reprocessed one or more additional times to generate the processed audio data. In some examples, each time the audio data is processed may result in processed audio data with even less of the background noise than prior processed audio data. As such, at operation 608 the method 600 may continue processing the audio data (e.g., reprocess the audio data) by repeating operation 606. However, if the processed audio data is sufficient (e.g., the processed audio data has been processed a threshold number of times, the processed audio data contains less than a threshold amount of background noise, etc.), then the method 600 may proceed to operation 610.

At operation 610, the method 600 may include providing the processed audio data to a computing device of the vehicle. Additionally, or alternatively, the processed audio data may be provided to a remote computing device/system. In this way, the computing device of the vehicle and/or the remote computing device/system may utilize the processed audio data to determine the sensor signature associated with the processed audio data and/or determine operating statuses associated with the vehicle component.

FIG. 7 is a flowchart illustrating an example method 700 for using a machine learned model to monitor vehicle health. At operation 702, the method 700 includes receiving sensor data indicative of an operating status associated with a component of a vehicle. In some examples, the sensor data may comprise log data that was captured by sensors of a vehicle that experienced a failure or other anomaly associated with the component. Additionally, or alternatively, the sensor data may be generated and/or simulated on a test bench. In at least one example, the sensor data may be captured during a test mode of a vehicle by activating the component of the vehicle and capturing sensor data associated with the component via one or more sensors of the vehicle. In various examples, the sensor data may include audio data, IMU data, accelerometer data, image data, pressure data, temperature data, electrical voltage measurements, electrical current measurements, and the like. The sensor data may be associated with a component of the vehicle, such as an HVAC system, brake system, window/door seals, rotating machinery of the vehicle, or any other component of the vehicle. The sensor data may be received at a computing device of the vehicle, such as vehicle computing device 404, and/or at a remote computing device, such as computing devices 440. Additionally, or alternatively, the sensor data may be stored in a memory of the vehicle computing device 404 and later uploaded to the computing devices 440.

At operation 704, the method 700 includes determining a component of the vehicle (e.g., brake system, HVAC system, etc.) that is associated with generating the sensor data and, at operation 706, the method 700 may include determining an operating status associated with the component. In some examples, the component of the vehicle and/or the operating status may be determined by a human labeler to generate labeled training data to train a machine learned model. Additionally, or alternatively, the component of the vehicle and/or the operating status may be determined automatically based on previously stored data, such as log data 448 and/or fault logs 456, which include one or more instances of sensor data associated with a component during operation and an indication of a fault or failure of the component at a later time.

In at least one example, the sensor data may be used as training data. The training data may include a pre-configured designation of the operating status of the component that the training data is representative of. The pre-configured designation of the operating status may be any of the operating status indications described herein and may be based on the previously stored log data and/or fault logs associated with the component. Additionally, or alternatively, the training data may include a pre-configured designation of the identification of the component that the training data is representative of. In various examples, the training data may include second sensor data captured by one or more other sensors of another vehicle. The second sensor data may additionally be associated with the component of the second vehicle.

At operation 506, the method 700 includes processing the first data. In some examples, the first data may comprise raw sensor data. As such, the sensor data may be processed to generate processed sensor data. In some examples, and as described with reference to FIG. 6 above, processing the sensor data may include removing and/or reducing portions of data (e.g., background noise) from the sensor data and/or isolating portions of the sensor data attributable to the component of interest.

At operation 708, the method 700 includes inputting the sensor data into a machine learned model. In some examples, the sensor data may include raw sensor data. Additionally, or alternatively, the sensor data may include processed sensor data (e.g., sensor data that has been filtered according to one or more filtering algorithms). By way of example and not limitation, the machine learned model may comprise and/or utilize a penalized linear regression model, a linear regression model, decision tree, logistic regression model, a support vector machine (SVM), a Naive Bayes model, a k-nearest neighbors (KNN) model, a k-Means model, a neural network, or other logic, model, or algorithm alone or in combination.

At operation 710, the method 700 includes receiving a predicted operating status associated with the component of the vehicle from the machine learned model. In some examples, the predicted operating status may be predicted by the machine learned model based at least in part on one or more prior inputs to the machine learned model. Additionally, or alternatively, the predicted operating status may be predicted by the machine learned model based at least in part on one or more alterations to parameters of the machine learned model based on the machine learned model making a prior, incorrect prediction. In some examples, the predicted operating status may include an indication of wear associated with the component of the vehicle, a predicted and/or estimated time-to-failure associated with the component, and/or an indication of an anomaly associated with the component.

At operation 712, the method 700 may include determining whether there is a difference between the operating status (e.g., the actual or measured operating status determined at 706) and the predicted operating status. In some examples, the difference may be determined by a human operator who is training the machine learned model. Additionally, or alternatively, the difference may be determined by a computer that is training the machine learned model.

In some examples, no difference may exist between the operating status and the predicted operating status (e.g., the machine learned model made the correct prediction). In that case, at operation 714 the method 700 may determine to proceed back to operation 702 to continue training the machine learned model with additional sensor data. For instance, the machine learned model may have not output greater than a threshold number of correct predicted operating status outputs. Additionally, or alternatively, if no difference exists, then the machine learned model may be determined to be adequately trained and training may cease.

However, if a difference does exist between the operating status and the predicted operating status, then at operation 714 the method 700 may determine to proceed on to operation 716. At operation 714, the method 700 may include altering one or more parameters of the machine learned model to minimize the difference to obtain a trained machine learned model. For instance, a parameter of the machine learned model algorithm may be adjusted to obtain increased and/or more frequent correct predictions from the machined learned model. After adjusting one or more parameters of the machine learned model, the method 700 may, in some examples, proceed to operation 708, where the sensor data may be re-inputted into the machine learned model. However, the method 700 may proceed to other operations, such as operation 702, 704, 706, etc. In this way, the machine learned model may be trained again using the same sensor data to determine if the machine learned model makes a correct prediction.

In some examples, the trained machine learned model may reside in memory that is stored locally at the vehicle, such as on a vehicle computing device, and/or may reside in memory that is stored remotely from the vehicle, such as on a server computing device or a computing device associated with a remote monitoring system of the vehicle.

The methods 500, 600, and 700 described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the methods 500, 600, and 700 may be combined in whole or in part with each other or with other methods.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A. A system comprising: one or more processors; and one or more computer-readable media storing instructions that, when executed by the one or more processors, cause the system to perform operations comprising: activating, at a first time, a component of a vehicle; receiving, from an audio sensor of the vehicle, first audio data associated with the component of the vehicle at the first time; determining, based at least in part on processing the first audio data, a first sensor signature associated with the component of the vehicle; storing the first sensor signature; determining, based at least in part on second audio data, a second sensor signature associated with the component of the vehicle at a second time subsequent to the first time; determining that a variation between the first sensor signature and the second sensor signature is greater than a threshold variation; and based at least in part on the variation being greater than the threshold variation, outputting an operating status associated with the component.

B. The system as paragraph A recites, wherein determining the second sensor signature associated with the component of the vehicle comprises: activating the component of the vehicle; receiving, from the audio sensor, the second audio data associated with the component of the vehicle; and determining, based at least in part on processing the second audio data, the second sensor signature associated with the component of the vehicle.

C. The system as any one of paragraphs A or B recites, the operations further comprising: controlling operation of another component of the vehicle at the first time according to an operating parameter; and controlling operation of the other component at the second time according to the operating parameter, wherein the operating parameter comprises at least one of speed, steering angle, braking condition, location, temperature, or time of day.

D. The system as any one of paragraphs A-C recites, wherein at least a portion of the first audio data comprises audio data attributable to the component and background noise, and wherein processing the first audio data comprises filtering the first audio data to remove the background noise.

E. The system as any one of paragraphs A-D recites, wherein determining that the variation between the first sensor signature and the second sensor signature is greater than the threshold variation is based at least in part on at least one of frequency, magnitude, or tonality of the first sensor signature and the second sensor signature.

F. A method comprising: receiving a first sensor signature indicative of an operating status associated with a component of a vehicle; activating the component of the vehicle; receiving, from a sensor of the vehicle, data associated with the component; determining, based at least in part on the data, a second sensor signature associated with the component; determining an association between the first sensor signature and the second sensor signature; and based at least in part on the association, outputting the operating status associated with the component.

G. The method as paragraph F recites, further comprising: receiving second data associated with another component of a same type as the component; and determining, based at least in part on the second data, the first sensor signature.

H. The method as any one of paragraphs F or G recites, further comprising, while activating the component of the vehicle, controlling operation of another component of the vehicle according to an operating parameter, wherein the operating parameter comprises at least one of speed, steering angle, braking condition, location, temperature, or time of day.

I. The method as any one of paragraphs F-H recites, wherein the sensor comprises a microphone and the data comprises audio data associated with the component and background noise, and wherein determining the second sensor signature further comprises processing the data to remove the background noise.

J. The method as any one of paragraphs F-I recites, further comprising: determining, based at least in part on the second sensor signature, the operating status, wherein the operating status comprises at least one of an indication of wear associated with the component, a predicted time-to-failure associated with the component, or an indication of an anomaly associated with the component.

K. The method as any one of paragraphs F-J recites, further comprising causing at least one of the vehicle or the component to be serviced based at least in part on the operating status.

L. The method as any one of paragraphs F-K recites, wherein at least one of the first sensor signature or the second sensor signature comprises data time series of measurements from the sensor over time and is associated with one or more operating parameters associated with the vehicle.

M. The method as any one of paragraphs F-L recites, wherein outputting the operating status associated with the component comprises sending data indicative of the operating status to a remote monitoring system associated with the vehicle.

N. The method as any one of paragraphs F-M recites, further comprising: storing the data in a local memory of the vehicle; and sending the data over a network and to a remote computing system associated with the vehicle.

O. The method as any one of paragraphs F-N recites, wherein the sensor comprises a microphone, an inertial measurement unit (IMU), an accelerometer, or a piezoelectric sensor.

P. The method as any one of paragraphs F-O recites, wherein the sensor comprises one or more microphones to localize sound associated with the component of the vehicle.

Q. One or more non-transitory computer-readable storage media storing instructions that, when executed by one or more processors, cause the one or more processors to perform operations comprising: receiving a first sensor signature indicative of an operating status associated with a component of a vehicle; activating the component of the vehicle; receiving, from a sensor of the vehicle, data associated with the component; determining, based at least in part on the data, a second sensor signature associated with the component; and based at least in part on an association between the first sensor signature and the second sensor signature, outputting an operating status associated with the component.

R. The one or more non-transitory computer-readable storage media as paragraph Q recites, wherein the sensor comprises a microphone and the data comprises audio data associated with the component and background noise, and wherein determining the second sensor signature further comprises processing the data to remove the background noise.

S. The one or more non-transitory computer-readable storage media as any one of paragraphs Q or R recites, the operations further comprising: determining, based at least in part on the second sensor signature, the operating status, wherein the operating status comprises at least one of an indication of wear associated with the component, a predicted time-to-failure associated with the component, or an indication of an anomaly associated with the component.

T. The one or more non-transitory computer-readable storage media as any one of paragraphs Q-S recites, the operations further comprising: receiving second data associated with another component of a same type as the component; and determining, based at least in part on the second data, the first sensor signature.

U. A system comprising: one or more processors; and one or more computer-readable media storing instructions that, when executed by the one or more processors, cause the one or more processors to perform operations comprising: receiving sensor data captured by one or more sensors of a vehicle, the sensor data comprising audio data indicative of an operating status associated with a component of the vehicle; determining the component of the vehicle associated with generating the audio data; determining the operating status associated with the component of the vehicle; inputting, into a machine learned model, the audio data; receiving, from the machine learned model, a predicted operating status associated with the component of the vehicle; determining a difference between the predicted operating status associated with the component and the operating status associated with the component; and based at least in part on the difference, altering one or more parameters of the machine learned model to minimize the difference to obtain a trained machine learned model trained to predict the operating status of the component of the vehicle.

V. The system as paragraph U recites, wherein the machine learned model comprises at least one of a penalized linear regression model or a decision tree.

W. The system as any one of paragraphs U or V recites, wherein the audio data represents at least an acoustic signature associated with the component and background noise, the operations further comprising: identifying the background noise of the audio data; processing at least a portion of the audio data to remove at least a portion of the background noise to generate processed audio data; and inputting, into the machine learned model, the processed audio data.

X. The system as any one of paragraphs U-W recites, the operations further comprising: receiving additional sensor data captured by the one or more sensors of the vehicle, the additional sensor data comprising additional audio data; inputting, into the trained machine learned model, the additional audio data; and receiving, from the trained machine learned model and based at least in part on the additional audio data, the operating status associated with the component.

Y. A method comprising: receiving sensor data indicative of an operating status associated with a component of a vehicle; determining, based at least in part on the sensor data, the operating status associated with the component; inputting, into a machine learned model, the sensor data; receiving, from the machine learned model, a predicted operating status associated with the component of the vehicle; and based at least in part on the predicted operating status, altering a parameter of the machine learned model to obtain a trained machine learned model.

Z. The method as paragraph Y recites, wherein the sensor data comprises stored log data from a second vehicle that experienced a failure of another component of a same type as the component.

AA. The method as any one of paragraphs Y or Z recites, wherein the predicted operating status comprises at least one of an indication of wear associated with the component, a predicted time-to-failure associated with the component, or an indication of an anomaly associated with the component.

BB. The method as any one of paragraphs Y-AA recites, further comprising: determining an average time-to-failure associated with the component of the vehicle based at least in part on sensor data for multiple components having a same type as the component; receiving, from the machine learned model, an estimated time-to-failure associated with the component of the vehicle; and wherein altering the parameter of the machine learned model is further based at least in part on a difference between the average time-to-failure and the estimated time-to-failure.

CC. The method as any one of paragraphs Y-BB recites, wherein the sensor data comprises audio data representing at least an acoustic signature associated with the component and background noise, the method further comprising: identifying the background noise of the audio data; processing the audio data to remove at least a portion of the background noise to generate processed audio data; and inputting, into the machine learned model, the processed audio data.

DD. The method as any one of paragraphs Y-CC recites, wherein the sensor data comprises a series of measurements of at least one of audio data or inertial measurement unit (IMU) data.

EE. The method as any one of paragraphs Y-DD recites, wherein the sensor data comprises first audio data from a first acoustic sensor and second audio data from a second acoustic sensor, the method further comprising: determining one or more of the component or a location of the component based at least in part on the first audio data and the second audio data.

FF. The method as any one of paragraphs Y-EE recites, further comprising: receiving second sensor data captured by the one or more sensors of the vehicle; inputting, into the trained machine learned model, the second sensor data; and receiving, from the trained machine learned model, the operating status associated with the component of the vehicle.

GG. One or more non-transitory computer-readable storage media storing instructions that, when executed by one or more processors, cause the one or more processors to perform operations comprising: receiving sensor data indicative of an operating status associated with a component of a vehicle; determining, based at least in part on the sensor data, the operating status associated with the component; inputting, into a machine learned model, the sensor data; receiving, from the machine learned model, a predicted operating status associated with the component of the vehicle; and based at least in part on the predicted operating status, altering a parameter of the machine learned model to obtain a trained machine learned model.

HH. The one or more non-transitory computer-readable storage media as paragraph GG recites, wherein the sensor data comprises stored log data from a second vehicle that experienced a failure of another component of a same type as the component.

II. The one or more non-transitory computer-readable storage media as any one of paragraphs GG or HH recites, wherein the predicted operating status comprises at least one of an indication of wear associated with the component, a predicted time-to-failure associated with the component, or an indication of an anomaly associated with the component.

JJ. The one or more non-transitory computer-readable storage media as any one of paragraphs GG-II recites, the operations further comprising: determining an average time-to-failure associated with multiple components having a same type as the component; receiving, from the machine learned model, an estimated time-to-failure associated with the component of the vehicle; and wherein altering the parameter of the machine learned model is further based at least in part on a difference between the average time-to-failure and the estimated time-to-failure.

KK. The one or more non-transitory computer-readable storage media as any one of paragraphs GG-JJ recites, wherein the sensor data comprises a series of measurements of at least one of audio data or inertial measurement unit (IMU) data over time.

LL. The one or more non-transitory computer-readable storage media as any one of paragraphs GG-KK recites, wherein the sensor data comprises audio data representing at least an acoustic signature associated with the component and background noise, the operations further comprising: identifying the background noise of the audio data; processing the audio data to remove at least a portion of the background noise to generate processed audio data; and inputting, into the machine learned model, the processed audio data.

MM. The one or more non-transitory computer-readable storage media as any one of paragraphs GG-LL recites, wherein the sensor data comprises first audio data from a first acoustic sensor and second audio data from a second acoustic sensor, the method further comprising: determining one or more of the component or a location of the component based at least in part on the first audio data and the second audio data.

NN. The one or more non-transitory computer-readable storage media as any one of paragraphs GG-MM recites, the operations further comprising: receiving second sensor data captured by the one or more sensors of the vehicle; inputting, into the trained machine learned model, the second sensor data; and receiving, from the trained machine learned model, the operating status associated with the component of the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-NN may be implemented alone or in combination with any other one or more of the examples A-NN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing instructions that, when executed by the one or more processors, cause the system to perform operations comprising:

activating, at a first time, a component of a vehicle;

receiving, from an audio sensor of the vehicle, first audio data associated with the component of the vehicle at the first time;

determining, based at least in part on processing the first audio data, a first sensor signature associated with the component of the vehicle;

storing the first sensor signature;

determining, based at least in part on second audio data, a second sensor signature associated with the component of the vehicle at a second time subsequent to the first time;

determining that a variation between the first sensor signature and the second sensor signature is greater than a threshold variation; and based at least in part on the variation being greater than the threshold variation, outputting an operating status associated with the component.

2. The system of claim 1, wherein determining the second sensor signature associated with the component of the vehicle comprises:

activating the component of the vehicle;

receiving, from the audio sensor, the second audio data associated with the component of the vehicle; and determining, based at least in part on processing the second audio data, the second sensor signature associated with the component of the vehicle.

3. The system of claim 1, the operations further comprising:

controlling operation of another component of the vehicle at the first time according to an operating parameter; and controlling operation of the other component at the second time according to the operating parameter, wherein the operating parameter comprises at least one of speed, steering angle, braking condition, location, temperature, or time of day.

4. The system of claim 1, wherein at least a portion of the first audio data comprises audio data attributable to the component and background noise, and wherein processing the first audio data comprises filtering the first audio data to remove the background noise.

5. The system of claim 1, wherein determining that the variation between the first sensor signature and the second sensor signature is greater than the threshold variation is based at least in part on at least one of frequency, magnitude, or tonality of the first sensor signature and the second sensor signature.

6. A method comprising:

activating, at a first time, a component of a vehicle;

receiving, from an audio sensor of the vehicle, first audio data associated with the component of the vehicle at the first time;

determining, based at least in part on processing the first audio data, a first sensor signature associated with the component of the vehicle;

storing the first sensor signature;

determining, based at least in part on second audio data, a second sensor signature associated with the component of the vehicle at a second time subsequent to the first time;

determining that a variation between the first sensor signature and the second sensor signature is greater than a threshold variation; and based at least in part on the variation being greater than the threshold variation, outputting an operating status associated with the component.

7. The method of claim 6, further comprising controlling operation of another component of the vehicle according to an operating parameter, wherein the operating parameter comprises at least one of speed, steering angle, braking condition, location, temperature, or time of day.

8. The method of claim 6, wherein the audio sensor comprises a microphone and the first audio data comprises audio data associated with the component and background noise, and wherein determining the second sensor signature further comprises processing the audio data to remove the background noise.

9. The method of claim 6, further comprising:

determining, based at least in part on the second sensor signature, the operating status, wherein the operating status comprises at least one of an indication of wear associated with the component, a predicted time-to-failure associated with the component, or an indication of an anomaly associated with the component.

10. The method of claim 6, further comprising causing at least one of the vehicle or the component to be serviced based at least in part on the operating status.

11. The method of claim 6, wherein at least one of the first sensor signature or the second sensor signature comprises data time series of measurements from the audio sensor over time and is associated with one or more operating parameters associated with the vehicle.

12. The method of claim 6, wherein outputting the operating status associated with the component comprises sending first sensor signature indicative of the operating status to a remote monitoring system associated with the vehicle.

13. The method of claim 6, further comprising:

storing the first sensor signature in a local memory of the vehicle; and sending the first sensor signature over a network and to a remote computing system associated with the vehicle.

14. The method of claim 6, wherein the audio sensor comprises a microphone, an inertial measurement unit (IMU), an accelerometer, or a piezoelectric sensor.

15. The method of claim 6, wherein the audio sensor comprises one or more microphones to localize sound associated with the component of the vehicle.

16. One or more non-transitory computer-readable storage media storing instructions that, when executed by one or more processors, cause the one or more processors to perform operations comprising:

activating, at a first time, a component of a vehicle;

receiving, from an audio sensor of the vehicle, first audio data associated with the component of the vehicle at the first time;

determining, based at least in part on processing the first audio data, a first sensor signature associated with the component of the vehicle;

storing the first sensor signature;

determining, based at least in part on second audio data, a second sensor signature associated with the component of the vehicle at a second time subsequent to the first time;

determining that a variation between the first sensor signature and the second sensor signature is greater than a threshold variation; and based at least in part on the variation being greater than the threshold variation, outputting an operating status associated with the component.

17. The one or more non-transitory computer-readable storage media of claim 16, wherein the operating status comprises at least one of an indication of wear associated with the component, a predicted time-to-failure associated with the component, or an indication of an anomaly associated with the component.

18. The method of claim 6, wherein determining that the variation between the first sensor signature and the second sensor signature is greater than the threshold variation is based at least in part on at least one of frequency, magnitude, or tonality of the first sensor signature and the second sensor signature.

19. The one or more non-transitory computer-readable storage media of claim 16, wherein determining that the variation between the first sensor signature and the second sensor signature is greater than the threshold variation is based at least in part on at least one of frequency, magnitude, or tonality of the first sensor signature and the second sensor signature.

20. The one or more non-transitory computer-readable storage media of claim 16, wherein the audio sensor comprises a microphone and the first audio data comprises audio data associated with the component and background noise, and wherein determining the second sensor signature further comprises processing the audio data to remove the background noise.

* * * * *